(12) United States Patent
Arita et al.

(10) Patent No.: US 6,346,941 B1
(45) Date of Patent: Feb. 12, 2002

(54) INTERFERENCE CHECK RESULT DISPLAYING METHOD AND INTERFERENCE CHECK RESULT DISPLAYING APPARATUS AS WELL AS COMPUTER-READABLE RECORDING MEDIUM HAVING INTERFERENCE CHECK RESULT DISPLAYING PROGRAM RECORDED THEREON

(75) Inventors: Yuichi Arita; Naoyuki Nozaki, both of Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/256,082

(22) Filed: Feb. 24, 1999

(30) Foreign Application Priority Data

Mar. 19, 1998 (JP) .............................. 10-071047

(51) Int. Cl.[7] .............................. G06T 15/10
(52) U.S. Cl. .................. 345/427; 345/420; 345/958; 382/102
(58) Field of Search .............................. 345/419, 420, 345/427, 958; 382/103

(56) References Cited

U.S. PATENT DOCUMENTS 5,943,056 A * 8/1999 Sato et al. ................. 345/419
6,167,142 A * 12/2000 Nozaki ....................... 382/103

FOREIGN PATENT DOCUMENTS

| JP | 7-134735 | 5/1995 |
| JP | 8-077210 | 3/1996 |
| JP | 9-027046 | 1/1997 |
| JP | 9-054972 | 2/1997 |

* cited by examiner

Primary Examiner—Mark Zimmerman
Assistant Examiner—Kimbinh T. Nguyen
(74) Attorney, Agent, or Firm—Staas & Halsey LLP

(57) ABSTRACT

The present invention provides an interference check result displaying method, by which a rough position and a precise position of a representative point at which contact or interference occurs between objects present in a virtual three-dimensional space. Consequently, not only a rough position but also a precise position of a representative point at which contact or interference occurs can be recognized readily. Further, also in a case wherein such a real time performance as to perform an interference check while an object is moved or rotated, a rough position and a precise position of a representative point at which contact/interference occurs can be recognized similarly readily. Also where a plurality of representative points are present, a designated representative point can be identified readily from other representative points, and also representative points which are hidden by different objects can be recognized readily.

14 Claims, 20 Drawing Sheets

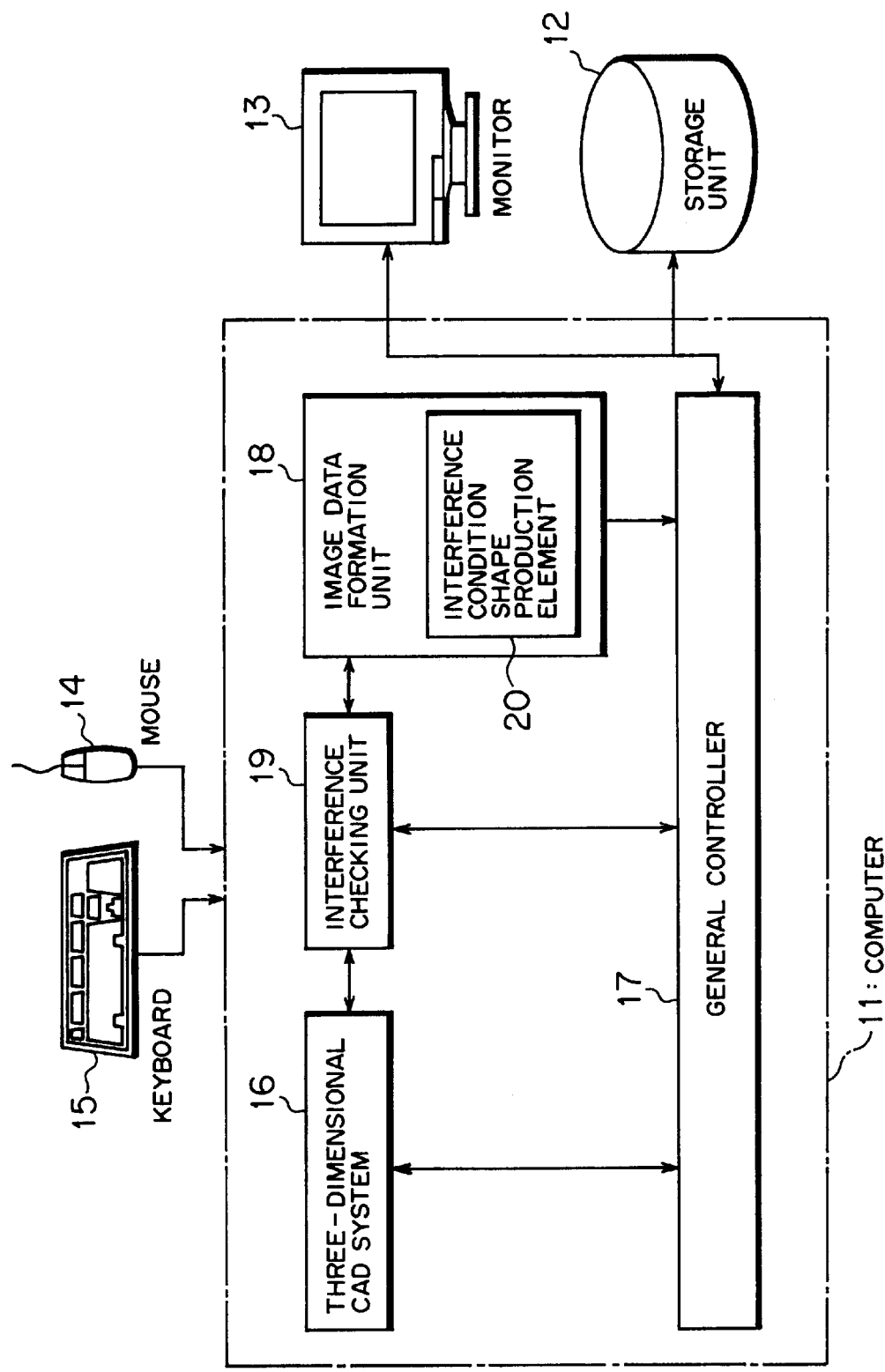

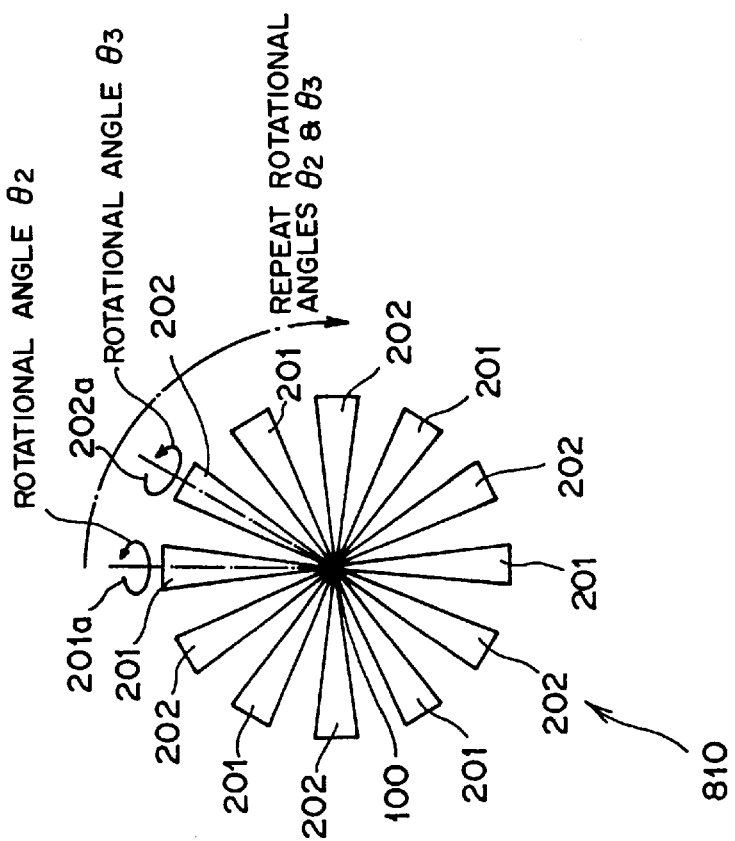
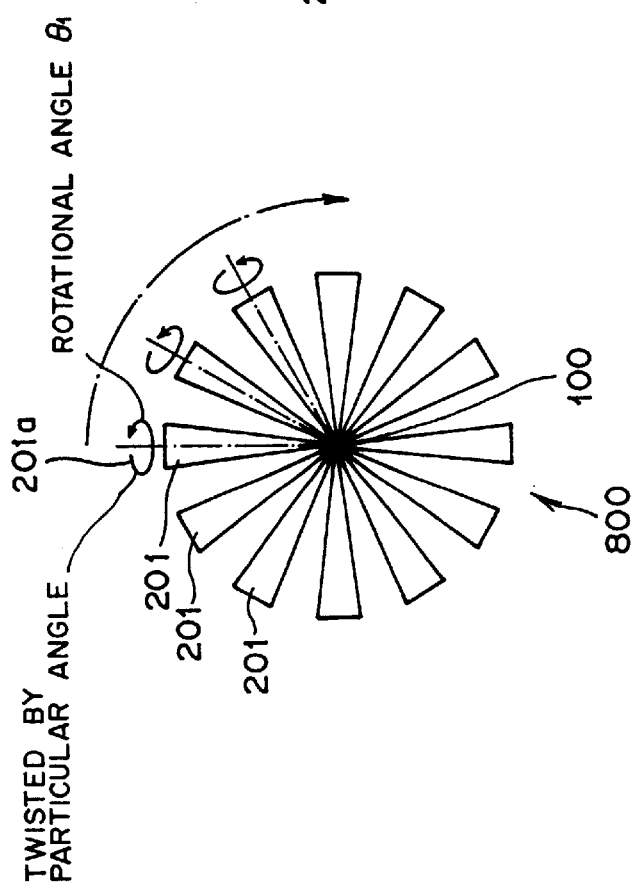
FIG. 8A
FIG. 8B

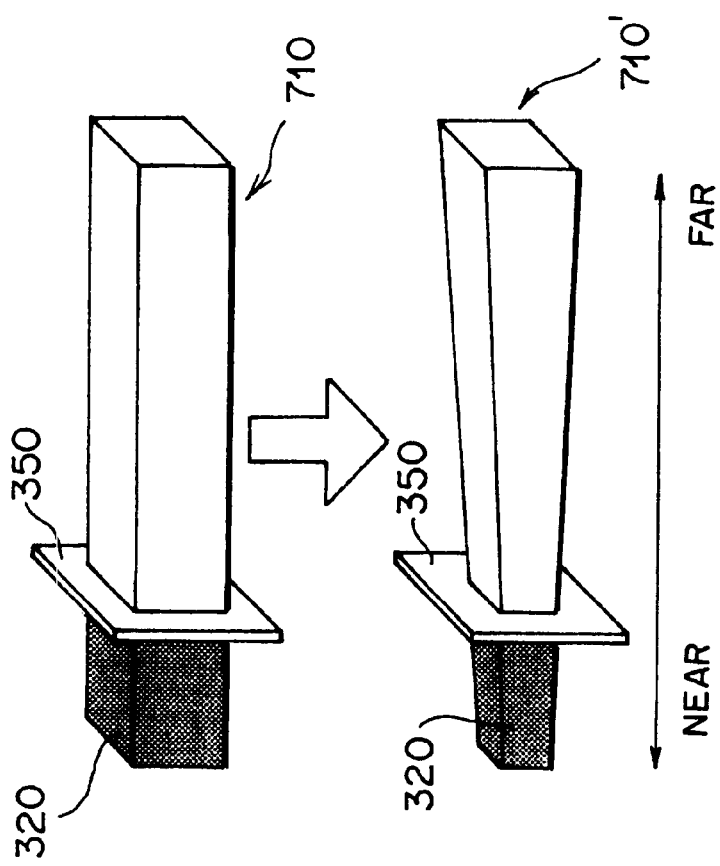
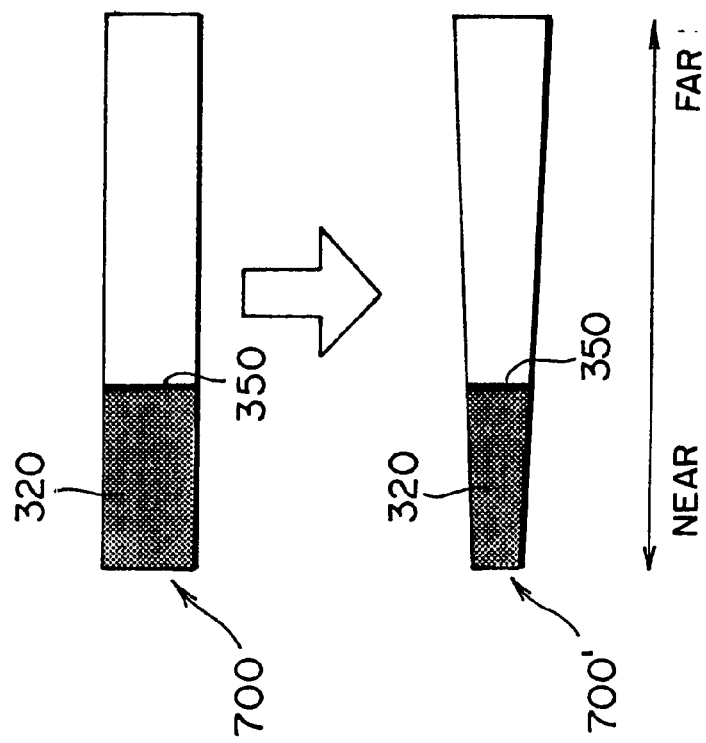

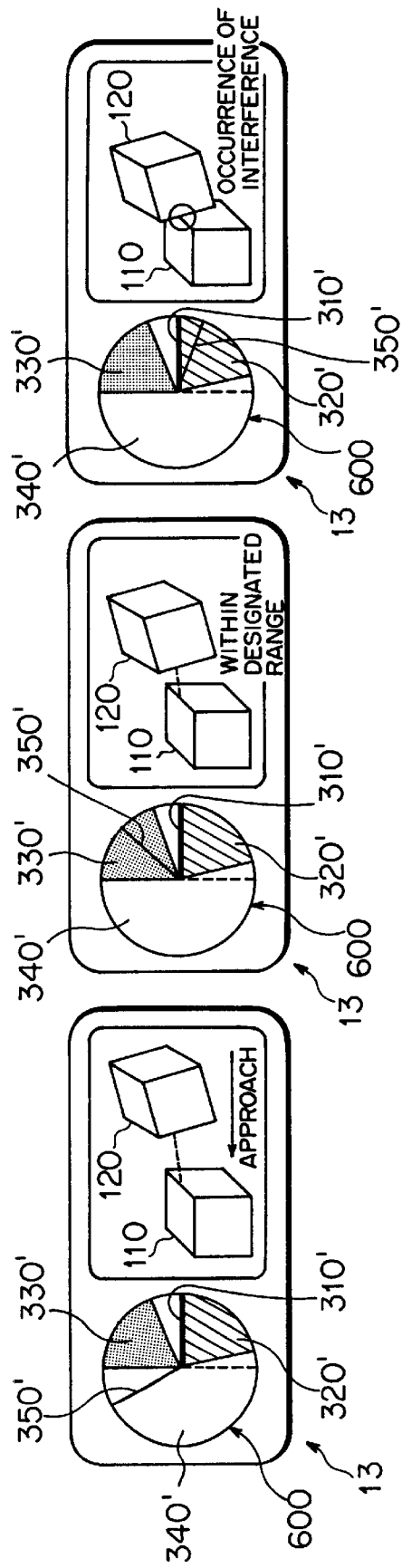

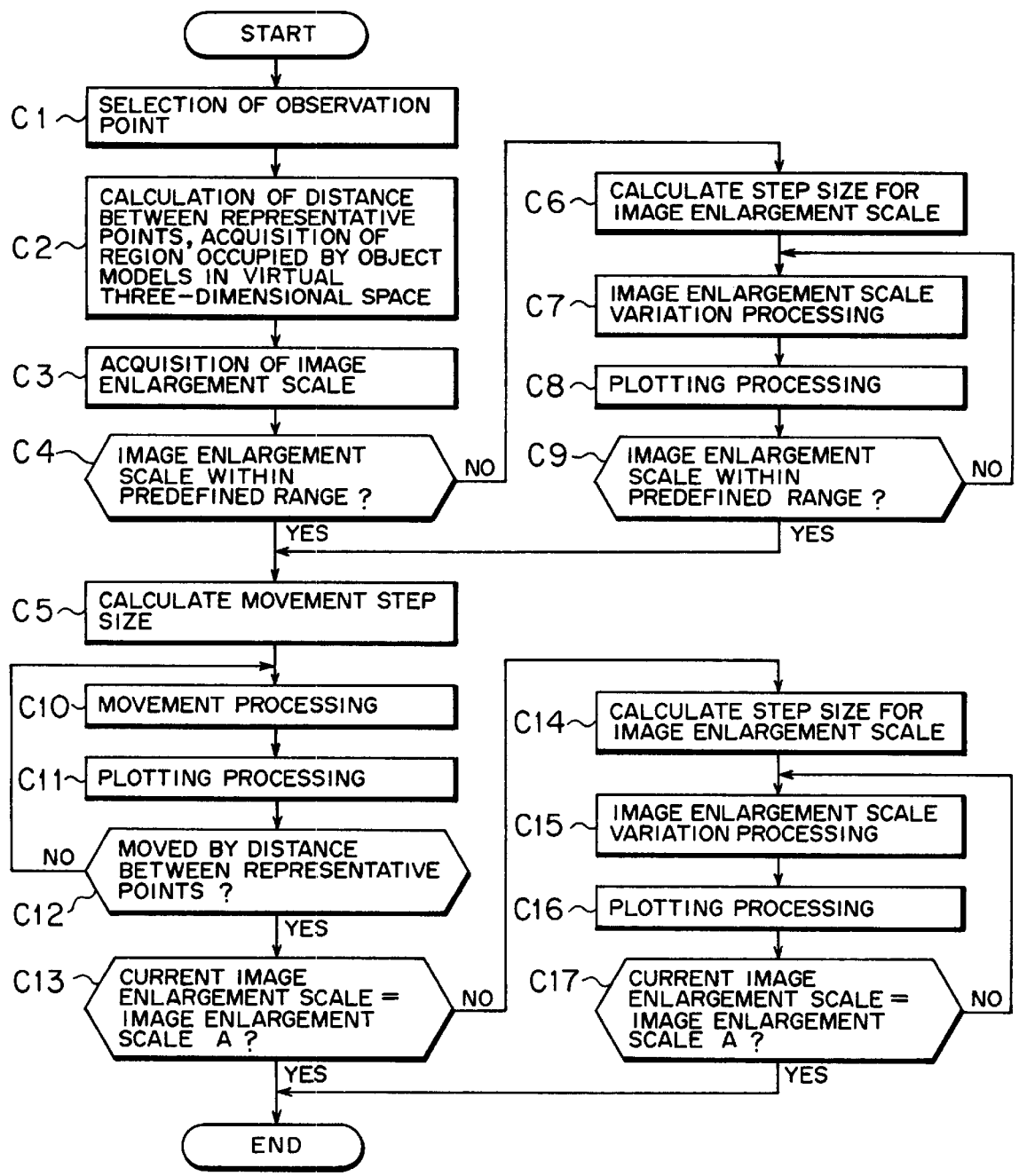

INTERFERENCE CHECK RESULT DISPLAYING METHOD AND INTERFERENCE CHECK RESULT DISPLAYING APPARATUS AS WELL AS COMPUTER-READABLE RECORDING MEDIUM HAVING INTERFERENCE CHECK RESULT DISPLAYING PROGRAM RECORDED THEREON

BACKGROUND OF THE INVENTION

1) Field of the Invention

This invention relates to an interference check result displaying method and an interference check result displaying apparatus as well as a computer-readable recording medium having an interference check result displaying program recorded thereon suitable for use to display a result of interference checking processing between a plurality of objects constructed in a virtual three-dimensional space set on a computer.

2) Description of the Related Art

In recent years, use of a design technique which employs three-dimensional CAD in designing of equipments, apparatus and so forth has been increasing. In designing wherein such three-dimensional CAD is employed, it is essentially required to perform a check of interference between objects constructed in a virtual three-dimensional space set on a computer before the designed objects are actually manufactured for trial.

An interference checking function in three-dimensional CAD requires much time for processing. Therefore, the following method is used. In particular, an interference check is performed in a stationary condition of object models of an interference check subject, and after completion of the interference checking processing, a result of it is displayed on a monitor or the like for confirmation. Further, where an object model rotates or moves, a movement of the object is defined in advance, and an interference check is performed for each predetermined movement amount of the object model. After all interference checking processing is completed, a result of the processing is displayed on a monitor or the like for confirmation.

For a technique for confirmation of a result of an interference check, only a technique is used wherein a shared or common space (volume) between object models between which interference is found is displayed on a monitor or the like. Further, for a method of displaying a result of an interference check, particularly a technique of displaying an outer profile of a shared space by line drawing or in a different color, another technique of displaying only a shared space and some other techniques are used.

FIG. 22 illustrates a known interference check result displaying method and illustrates a screen displaying condition of an interference portion displaying apparatus disclosed in Japanese Patent Laid-Open No. 54792/1997. Referring to FIG. 22, according to the known interference check result displaying method illustrated, an interference portion (shared space) between object models is displayed in a screened display. If it is discriminated that the interference portion is so small that it is very difficult to confirm the interference part, a region of a predetermined shape surrounding the interference part such as a circle, a rectangular parallelepiped or a polygon is plotted to display the interference part centered at an interference part representative point (one of the point of the center of gravity of the interference part, the point of the center of the figure and an arbitrary apex) on a monitor 1,000, and the interference portion is displayed in an enlarged scale (refer to reference numeral 1,001 of FIG. 22) or child screens 1,002 of the interference part as viewed in a plurality of directions (a two-dimensional screen as viewed from the front, a side or the top) are displayed (refer to the right upper side of FIG. 22). Further, where two or more interference portions are involved, a result of an interference check is displayed in a balloon display in accordance with the necessity.

In recent years, as a method of an interference check, a very high speed interference checking system has become used wherein an object model is represented as a plurality of planar surface polygons and, as a result of interference checking processing, interference points or nearest points are calculated on grating points, sides or polygon faces of the polygons, and when contact/interference occurs, the interference points or nearest points are returned as a check result.

By such a high speed interference checking method as described above, movement or rotation of an object, an interference check and displaying of a result of the interference check can be performed in approximately several cycles or several tens cycles per one second. Consequently, operations which have not conventionally been performed very much because much time is required for interference checking processing such as an operation of performing an interference check while moving or rotating an object arbitrarily to confirm an interfering portion on the real time basis have begun to be performed.

In order to confirm a condition of an interfering portion where the positional relationship between object models varies and is displayed every time, an interference check result displaying method which allows easy confirmation of an interference condition between object models and is suitable for a system having a displaying function which allows high speed switching is demanded.

However, the interference check result displaying method described above is a result displaying method as one of techniques for determining an interference portion (shared space) between object models and has been invented from the point of view of how to facilitate observation of a shared space determined as a result of an interference check. Therefore, the interference check result displaying method has a subject to be solved in that, when an interference check is performed while an object model is moved or rotated arbitrarily in a virtual three-dimensional space and a result of the interference checking processing is displayed on the real time basis, the position and so forth of an interfering portion displayed on the display unit cannot be discriminated readily.

Also a displaying method is demanded which allows, when a plurality of interference portions (representative points) are present and a particular one of the representative points is designated, the designated representative point to be distinguished on the display from the other representative points or allows a plurality of representative points to be confirmed successively. Further, where a plurality of representative points are present, since the possibility is high that representative points other than a designated particular representative point may be hidden and blocked by the displayed object models, also an interference check result displaying method which allows easy confirmation of representative points hidden by such object models is demanded.

Also a displaying method is demanded which is suitable for substantially real time supervision not of interference but of variation of the positional relationship between particular objects when any of the objects is moved or rotated.

SUMMARY OF THE INVENTION

It is an object of the present invention to provide an interference check result displaying method and an interference check result displaying apparatus as well as a computer-readable recording medium having an interference check result displaying program recorded thereon which are improved to allow easy recognition of a rough position and a precise position of a representative point at which contact/interference occurs.

It is another object of the present invention to provide an interference check result displaying method and an interference check result displaying apparatus as well as a computer-readable recording medium having an interference check result displaying program recorded thereon which are improved to allow, also where such a real time performance as to perform an interference check while an object is moved or rotated, easy recognition of a rough position and a precise position of a representative point at which contact/interference occurs.

It is a further object of the present invention to provide an interference check result displaying method and an interference check result displaying apparatus as well as a computer-readable recording medium having an interference check result displaying program recorded thereon which are improved to allow, also where a plurality of representative points are present, recognition of a designated representative point from other representative points.

It is a still further object of the present invention to provide an interference check result displaying method and an interference check result displaying apparatus as well as a computer-readable recording medium having an interference check result displaying program recorded thereon which are improved to allow easy confirmation of representative points which are hidden by different objects.

In order to attain the objects of the present invention, there is provided an interference check result displaying method for displaying, as a result of interference checking processing performed between objects present in a virtual three-dimensional space, a representative point when contact/interference between the objects occurs on a display unit, comprising the step of displaying a rough position and a precise position of a representative point at which contact or interference occurs between the objects in the virtual three-dimensional space simultaneously on the display unit.

According to another aspect of the present invention, there is provided a computer-readable recording medium having an interference check result displaying program recorded thereon for causing a computer to realize an interference checking function for performing interference checking processing between objects present in a virtual three-dimensional space, and a display controlling function for controlling so that, when a result of the interference checking processing by the interference checking function reveals that contact or interference occurs between the objects in the virtual three-dimensional space, a rough position and a precise position of a representative point at which the contact or interference occurs between the objects are displayed simultaneously.

With the interference check result displaying method and the computer-readable recording medium having an interference check result displaying program recorded thereon, since a rough position and a precise position of a representative point at which contact or interference occurs between objects present in a virtual three-dimensional space are displayed simultaneously, there is an advantage that occurrence of contact or interference can be recognized readily and the precise position of the representative point can be recognized.

According to a further aspect of the present invention, there is provided an interference check result displaying method for displaying a result of interference checking processing performed between objects present in a virtual three-dimensional space on a display unit, comprising the step of displaying a variable shape which represents a distance or a relationship between nearest points of the objects as the result of the interference checking processing together with at least one of an index to a position at which contact between the objects occurs, another index to a range in which interference occurs and a further index to a range designated in advance within a range within which contact or interference does not occur.

According to a still further aspect of the present invention, there is provided a computer-readable recording medium having an interference check result displaying program recorded thereon for causing a computer to realize an interference checking function for performing interference checking processing between objects present in a virtual three-dimensional space, and a display controlling function for controlling so that a variable shape which represents a distance between nearest points of the objects as a result of the interference checking processing together with at least one of a distance of a range in which contact between the objects occurs, a distance of another range in which interference occurs and a further distance range designated in advance is displayed.

With the interference check result displaying method and the computer-readable recording medium having an interference check result displaying program recorded thereon, since a variable shape which represents a distance or a relationship between nearest points of the objects as a result of an interference check is displayed together with at least one of an index to a position at which contact between the objects occurs, another index to a range in which interference occurs and a further index to a range designated in advance within a range within which contact or interference does not occur, when an interference check is performed while an object is moved and a result of the interference check is displayed, a condition of a distance or a relationship between nearest points of the objects can be visually discerned readily, and a manner in which contact/interference occurs can be supervised continuously. Consequently, there is an advantage that the manner thus supervised can be reflected rapidly on a design change and so forth and the time for designing can be reduced.

According to a yet further aspect of the present invention, there is provided an interference check result displaying method for displaying, as a result of interference checking processing performed between objects present in a virtual three-dimensional space, a representative point when contact/interference between the objects occurs on a display unit, comprising the steps of designating, when the result of the interference checking processing performed reveals that a plurality of representative points appear, one of the representative points as a particular point, displaying the particular point in such a manner as to allow distinction thereof from the other representative points, calculating a cross section on the display with reference to a viewpoint for viewing the particular point in the virtual three-dimensional space and regions which the objects occupy in the virtual three-dimensional space, and displaying the particular point together with the calculated cross section on the display.

According to a yet further aspect of the present invention, there is provided a computer-readable recording medium having an interference check result displaying program recorded thereon for causing a computer to realize, an interference checking function for performing interference checking processing between objects present in a virtual three-dimensional space, and a display controlling function for controlling so that, when a result of the interference checking processing by the interference checking function reveals that contact or interference occurs between the objects, a representative point at which the contact or interference occurs is displayed, the display controlling function including a discrimination allowing display controlling function for controlling so that, when the interference checking processing reveals that a plurality of representative points appear and one of the representative points is designated as a particular point, the particular point is displayed in such a manner as to allow distinction thereof from the other representative points to allow confirmation of the particular point, a cross section calculation function for calculating a cross section on the display with reference to a viewpoint for viewing the designated particular point in the virtual three-dimensional space and regions which the objects occupy in the virtual three-dimensional space, and a cross section and particular point displaying function for controlling so that the particular point is displayed together with the cross section on the display calculated by the cross section calculation function.

With the interference check result displaying method and the computer-readable recording medium having an interference check result displaying program recorded thereon, when a result of interference checking processing performed reveals that a plurality of representative points appear, one of the representative points is designated as a particular point and the particular point is displayed in such a manner as to allow distinction thereof from the other representative points and then a cross section on the display is calculated with reference to a viewpoint for viewing the particular point in the virtual three-dimensional space and regions which the objects occupy in the virtual three-dimensional space and the particular point is displayed together with the calculated cross section on the display. Consequently, there is an advantage that a condition of contact/interference at the particular point can be confirmed readily and can be reflected rapidly on a design change and so forth and the time for designing can be reduced.

According to a yet further aspect of the present invention, there is provided an interference check result displaying apparatus, comprising an interference checking unit for performing interference checking processing between objects present in a virtual three-dimensional space, and a display control unit for controlling a display so that, when a result of the interference checking processing by the interference checking unit reveals that contact or interference occurs between the objects in the virtual three-dimensional space, a rough position and a precise position of a representative point at which the contact or interference occurs are displayed simultaneously.

With the interference check result displaying apparatus, since it includes the interference checking unit and the display control unit which controls the display so that a rough position and a precise position of a representative point are displayed simultaneously, there is an advantage that occurrence of contact or interference can be recognized readily and a precise position of the representative point can be recognized.

According to a yet further aspect of the present invention, there is provided an interference check result displaying apparatus, comprising an interference checking unit for performing interference checking processing between objects present in a virtual three-dimensional space, and a display control unit for controlling a display so that a variable shape which represents a distance between nearest points of the objects as a result of the interference checking processing performed by the interference checking unit together with at least one of an index to a position at which contact between the objects occurs, another index to a range in which interference occurs and a further index to a range designated in advance within a range within which contact or interference does not occur is displayed as the result of the interference checking processing.

With the interference check result displaying apparatus, since it includes the interference checking unit and the display control unit which controls the display so that a variable shape which represents a distance between nearest points of the objects together with at least one of an index to a position at which contact between the objects occurs, another index to a range in which interference occurs and a further index to a range designated in advance within a range within which contact or interference does not occur is displayed, when an interference check is performed while an object is moved and a result of the interference check is displayed, a condition of a distance or a relationship between nearest points can be visually discerned readily, and a manner in which contact/interference occurs can be supervised continuously. Consequently, the interference check result displaying apparatus is advantageous in that the manner thus supervised can be reflected rapidly on a design change and so forth and the time for designing can be reduced.

According to a yet further aspect of the present invention, there is provided an interference check result displaying apparatus, comprising an interference checking unit for performing interference checking processing between objects present in a virtual three-dimensional space, and a display control unit for controlling a display unit so that, when a result of the interference checking processing performed by the interference checking unit reveals that contact or interference occurs between the objects, a representative point at which the contact or interference occurs is displayed on the display unit, the display control unit including a discrimination allowing display control unit for controlling the display unit so that, when the interference checking processing reveals that a plurality of representative points appear and one of the representative points is designated as a particular point, the particular point is displayed in such a manner as to allow distinction thereof from the other representative points to allow confirmation of the particular point, and a cross section calculation unit for calculating a cross section on the display with reference to a viewpoint for viewing the designated particular point in the virtual three-dimensional space and regions which the objects occupy in the virtual three-dimensional space, the display control unit controlling the display unit so as to display the particular point together with the cross section on the display calculated by the cross section calculation unit.

With the interference check result displaying apparatus, since the display control unit which includes the discrimination allowing display control unit which controls the display unit so that the particular point is displayed in such a manner as to allow distinction thereof from the other representative points and the cross section calculation unit which calculates a cross section on the display controls the display unit so that the particular point is displayed together with the cross section on the display calculated by the cross section calculation unit, the interference check result displaying apparatus is advantageous in that a condition of contact/interference at the particular point can be confirmed readily and can be reflected rapidly on a design change and so forth and the time for designing can be reduced.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 4 is a block diagram showing a hardware construction and a function construction of an interference check result displaying apparatus to which the present invention is applied;

FIGS. 8A and 8B are diagrammatic views illustrating first and second modifications to the interference check result displaying method according to the first embodiment of the present invention;

FIGS. 13A and 13B are diagrammatic views schematically showing partially modified forms of interfering condition displaying shapes shown in FIGS. 11A and 11B;

FIGS. 14A to 14C and 15A to 15C are diagrammatic views illustrating different modifications to the interference check result displaying method according to the second embodiment of the present invention;

FIG. 20 is a flow chart illustrating the interference check result displaying method according to the third embodiment of the present invention;

DESCRIPTION OF THE PREFERRED EMBODIMENTS a. Aspects of the Invention

First, several aspects of the present invention are described with reference to the drawings.

Figure 1:
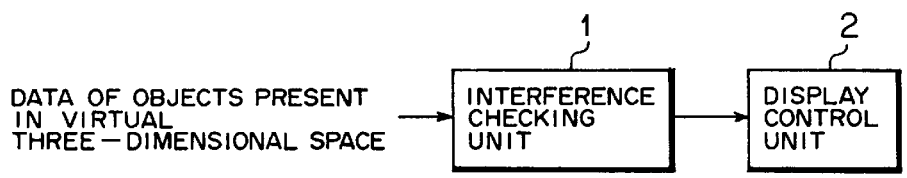
FIGS. 1 to 3 are block diagrams illustrating different aspects of the present invention.

FIG. 1 shows an interference check result displaying apparatus according to an aspect of the present invention. Referring to FIG. 1, the interference check result displaying apparatus includes an interference checking unit 1 for performing interference checking processing between objects present in a virtual three-dimensional space, and a display control unit 2 for controlling a display so that, when a result of the interference checking processing by the interference checking unit 1 reveals that contact or interference occurs between the objects in the virtual three-dimensional space, a rough position and a precise position of a representative point at which the contact or interference occurs are displayed simultaneously.

In the interference check result displaying apparatus having the construction described above, data of objects present in a virtual three-dimensional space inputted to the interference checking unit 1 undergo interference checking processing by the interference checking unit 1. If a result of the interference checking processing by the interference checking unit 1 reveals that contact or interference occurs between the objects in the virtual three-dimensional space, then information of the position of the representative point and so forth are sent to the display control unit 2. Then, display control is performed by the display control unit 2 so that a rough position and a precise position of the representative point are displayed simultaneously.

Consequently, with the interference check result displaying apparatus of the aspect of the present invention described above, since it includes the interference checking unit 1 and the display control unit 2 which controls the display so that a rough position and a precise position of a representative point are displayed simultaneously, it is advantageous in that occurrence of contact or interference can be recognized readily and a precise position of the representative point can be recognized.

Figure 2:
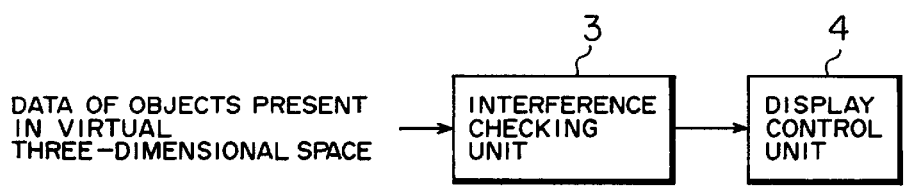

FIG. 2 shows an interference check result displaying apparatus according to another aspect of the present invention. Referring to FIG. 2, the interference check result displaying apparatus includes an interference checking unit 3 for performing interference checking processing between objects present in a virtual three-dimensional space, and a display control unit 4 for controlling a display so that a variable shape which represents a distance between nearest points of the objects as a result of the interference checking processing performed by the interference checking unit 3 together with at least one of an index to a position at which contact between the objects occurs, another index to a range in which interference occurs and a further index to a range designated in advance within a range within which contact or interference does not occur is displayed as the result of the interference checking processing.

In the interference check result displaying apparatus having the construction described above, data of objects present in a virtual three-dimensional space inputted to the interference checking unit 3 undergo interference checking processing by the interference checking unit 3, and information of the nearest point distance between the objects as a result of the interference checking processing by the interference checking unit 3 and so forth are sent to the display control unit 4.

The display control unit 4 performs display control based on the information of the nearest point distance between the objects received from the interference checking unit 3 so that a variable shape which represents a distance between nearest points of the objects as a result of the interference checking processing performed by the interference checking unit 3 together with at least one of an index to a position at which contact between the objects occurs, another index to a range in which interference occurs and a further index to a range designated in advance within a range within which contact or interference does not occur is displayed.

Consequently, with the interference check result displaying apparatus of the aspect of the present invention described above, since it includes the interference checking unit 3 and the display control unit 4 which controls the display so that a variable shape which represents a distance between nearest points of the objects together with at least one of an index to a position at which contact between the objects occurs, another index to a range in which interference occurs and a further index to a range designated in advance within a range within which contact or interference does not occur is displayed, when an interference check is performed while an object is moved and a result of the interference check is displayed, a condition of a distance or a relationship between nearest points can be visually discerned readily, and a manner in which contact/interference occurs can be supervised continuously. Consequently, the interference check result displaying apparatus is advantageous in that the manner thus supervised can be reflected rapidly on a design change and so forth and the time for designing can be reduced.

Figure 3:
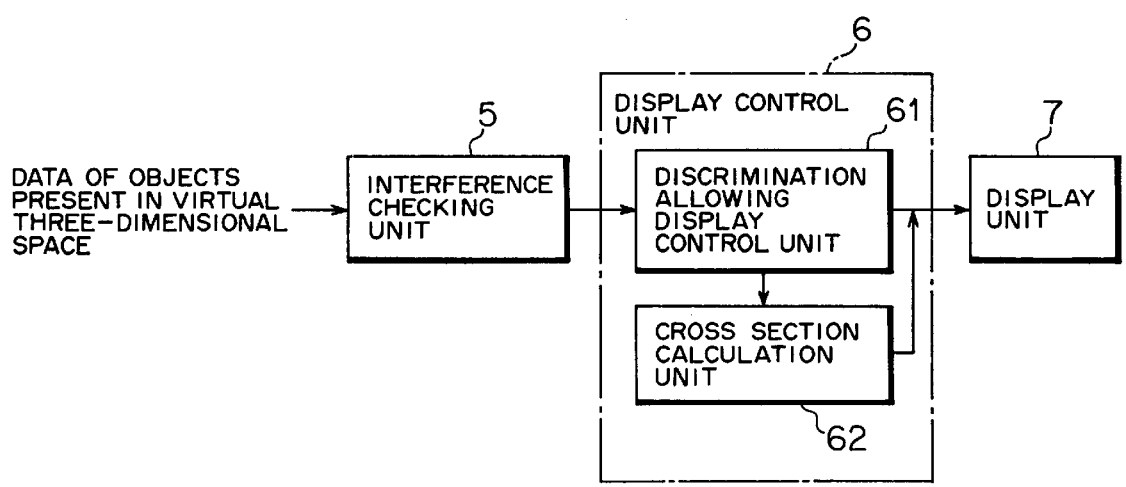

FIG. 3 shows an interference check result displaying apparatus according to a further aspect of the present invention. Referring to FIG. 3, the interference check result displaying apparatus includes an interference checking unit 5 for performing interference checking processing between objects present in a virtual three-dimensional space, and a display control unit 6 for controlling a display unit 7 so that, when a result of the interference checking processing performed by the interference checking unit 5 reveals that contact or interference occurs between the objects, a representative point at which the contact or interference occurs is displayed on the display unit 7. The display control unit 6 includes a discrimination allowing display control unit 61 and a cross section calculation unit 62.

The discrimination allowing display control unit 61 controls the display unit 7 so that, when the interference checking processing reveals that a plurality of representative points appear and one of the representative points is designated as a particular point, the particular point is displayed in such a manner as to allow distinction thereof from the other representative points to allow confirmation of the particular point. The cross section calculation unit 62 calculates a cross section on the display with reference to a viewpoint for viewing the designated particular point in the virtual three-dimensional space and regions which the objects occupy in the virtual three-dimensional space.

Further, the display control unit 6 controls the display unit 7 so as to display the particular point together with the cross section on the display calculated by the cross section calculation unit 62.

In the interference check result displaying apparatus having the construction described above, data of objects present in a virtual three-dimensional space inputted to the interference checking unit 5 undergo interference checking processing by the interference checking unit 5, and information of the position of a representative point at which contact/interference between the objects occurs and so forth are sent to the display control unit 6.

If the interference checking processing reveals that a plurality of representative points appear, then when one of the representative points is designated as a particular point, the discrimination allowing display control unit 61 of the display control unit 6 controls the display unit 7 so that the particular point is displayed in such a manner as to allow distinction thereof from the other representative points to allow confirmation of the particular point. Further, the cross section calculation unit 62 of the display control unit 6 calculates a cross section on the display with reference to a viewpoint for viewing the designated particular point in the virtual three-dimensional space and regions which the objects occupy in the virtual three-dimensional space.

Further, the display control unit 6 controls the display unit 7 so that the particular point is displayed together with the cross section on the display calculated by the cross section calculation unit 62.

Accordingly, with the interference check result displaying apparatus of the aspect of the present invention described above, since the display control unit 6 which includes the discrimination allowing display control unit 61 which controls the display unit 7 so that the particular point is displayed in such a manner as to allow distinction thereof from the other representative points and the cross section calculation unit 62 which calculates a cross section on the display controls the display unit 7 so that the particular point is displayed together with the cross section on the display calculated by the cross section calculation unit 62, the interference check result displaying apparatus is advantageous in that a condition of contact/interference at the particular point can be confirmed readily and can be reflected rapidly on a design change and so forth and the time for designing can be reduced.

b. Embodiments of the Invention

In the following, several embodiments of the present invention are described.

A. Hardware Construction and Functional Construction of Interference Check Result Displaying Apparatus to Which the Invention Is Applied FIG. 4 shows a hardware construction and a functional construction of an interference check result displaying apparatus to which the present invention is applied. Referring to FIG. 4, the interference check result displaying apparatus to which the present invention is applied includes a computer 11, a keyboard 15, a mouse 14, a monitor 13 and a storage unit 12.

The computer 11 includes a CPU (Central Processing Unit), a memory and so forth all not shown and serves as a central apparatus of the interference check result displaying apparatus as the storage unit 12 which can store various data and external inputting/outputting apparatus such as the keyboard 15 and the mouse 14 are connected to the computer 11.

The keyboard 15 and the mouse 14 are both used as inputting means to input an instruction for rotating or moving an object model, which is a subject of an interference check, in a three-dimensional space, necessary information and so forth.

The storage unit 12 includes a storage medium such as a hard disk and stores various programs for operating the interference check result displaying apparatus and various data such as a result of an interference check and so forth.

The monitor 13 is a display unit for displaying a result of operation by the computer 11. Also a result of an interference check is displayed on the monitor 13.

The computer 11 has functions as a three-dimensional CAD system 16, a general controller 17, an image data formation unit 18 and an interference checking unit 19 as seen from FIG. 4.

The three-dimensional CAD system 16 forms objects (object models) which are present in a virtual three-dimensional space and are a subject for which interference checking processing is to be performed, and develops a virtual three-dimensional space in the memory not shown and so forth and handles object models in the virtual three-dimensional space. Data of the object models formed by the three-dimensional CAD system 16 are sent to the general controller 17 through the memory (not shown) or the like of the computer 11.

The general controller 17 performs various controls such as inputting and outputting to and from the computer 11 and corresponds to an OS (Operating System) of a computer system. The general controller 17 performs various operation processes in accordance with instructions stored in advance in the storage unit 12, the memory (not shown) and so forth and inputs from the external inputting/outputting apparatus including the keyboard 15 and the mouse 14.

The general controller 17 controls operation of the image data formation unit 18, the interference checking unit 19 and so forth and transmits and receives various data to and from the image data formation unit 18, the interference checking unit 19 and so forth. For example, the general controller 17 sends data of object models formed by the three-dimensional CAD system 16 to the interference checking unit 19 so that the interference checking unit 19 may perform interference checking processing and sends a result of the interference checking processing to the image data formation unit 18 so that the image data formation unit 18 may produce image data for display.

Further, the general controller 17 controls the monitor 13, the storage unit 12 and so forth to cause a result of operation to be displayed on the monitor 13 serving as a display unit or to be stored into the storage unit 12.

The interference checking unit 19 performs, under the control of the general controller 17, interference checking processing for data of object models formed by the three-dimensional CAD system 16, and sends a result of the interference checking processing to the general controller 17, the image data formation unit 18 and so forth.

The interference checking unit 19 performs interference checking processing between object models present in a virtual three-dimensional space using an interference checking method disclosed in Japanese Patent Laid-Open No. 27046/1997, Japanese Patent Laid-Open No. 134735/1995, Japanese Patent Laid-Open No. 77210/1996 and so forth. In particular, the interference checking unit 19 supervises the movement amount and/or the moving velocity of an object model present in a virtual three-dimensional space or the distance between object models or some other parameter and performs calculation of interference checking processing when the supervised value exhibits a value higher than a preset value so that it can obtain a contact/interference point, a distance between nearest points of object models or the like as an interference check result.

In other words, interference checking processing between object models is performed at any time by moving an object model present in a virtual three-dimensional space using the keyboard 15, the mouse 14 or the like.

The interference checking processing is performed while each object model is represented by a plurality of planar surface polygons, and, for example, interference checking processing is performed in a condition wherein the polygons are individually divided into triangles and, as a result of the interference checking processing, contact/interference points or nearest points are obtained on grating points or sides of the triangular polygons or faces of the triangle polygons. When contact/interference occurs, a grating point of a triangular polygon or a point (contact/interference point) on a side of a triangular polygon or on a face of a triangle polygon at the contact/interference location is determined as a representative point.

Accordingly, when the interference checking unit 19 detects contact/interference as a result of interference checking processing, it sends representative point information to the image data formation unit 18 and the general controller 17.

The image data formation unit 18 forms image data to be used for display on the monitor 13 and forms various image data from an interference check result sent thereto from the interference checking unit 19 and other necessary information.

An interference condition shape production element 20 in the image data formation unit 18 produces a shape indicating an interference occurrence condition and controls the monitor 13 based on representative point information sent thereto from the interference checking unit 19 so that the monitor 13 may display the shape indicative of an interference occurrence condition.

It is to be noted that a representative point detected by the interference checking unit 19 and image data formed by the image data formation unit 18 are stored into the storage unit 12.

The keyboard 15 and the mouse 14 both function as representative point destination means, and designate a particular representative point using the keyboard 15 and the mouse 14 or inputs information of an appropriate viewpoint, an observation point, a display volume or the like as hereinafter described.

The monitor 13 displays an interference check result from the image data formation unit 18 or the general controller 17 so that an operator can confirm occurrence of contact/interference.

Several embodiments of the present invention regarding an interference check result displaying method which is performed by the interference check result displaying apparatus having such a construction as described above are described with reference to the drawings.

B. First Embodiment

An interference check result displaying method as the first embodiment of the present invention is performed by the interference check result displaying apparatus shown in FIG. 4. In the present embodiment, object models which are a subject of interference checking processing is formed by the three-dimensional CAD system 16, and data of object presents in a virtual three-dimensional space are sent from the three-dimensional CAD system 16 to the interference checking unit 19. The interference checking unit 19 performs interference checking processing between object models present in the virtual three-dimensional space.

Further, as a result of interference checking processing by the interference checking unit 19, information of a position of a representative point and so forth are sent to the image data formation unit 18, and an interference occurrence mark 900 (refer to FIGS. 5A and 5B) is produced by the interference condition shape production element 20 of the image data formation unit 18.

The interference occurrence mark 900 (refer to FIGS. 5A and 5B) produced by the interference condition shape production element 20 indicates a rough position and a precise position of the representative point simultaneously. In particular, the image data formation unit 18 controls the monitor 13 through the general controller 17 to display the interference occurrence mark 900 (refer to FIGS. 5A and 5B) together with object models for which the interference checking processing has been performed so that a rough position and a precise position of a representative point at which contact or interference occurs between the objects in the virtual three-dimensional space are displayed simultaneously. In other words, the image data formation unit 18 and the general controller 17 correspond to the display control unit 2 shown in FIG. 1.

The interference check result displaying apparatus of the first embodiment of the present invention is constructed in such a manner as described above. Subsequently, different displaying manners of an interference check result by the interference check result displaying apparatus is described.

Figure 5A:
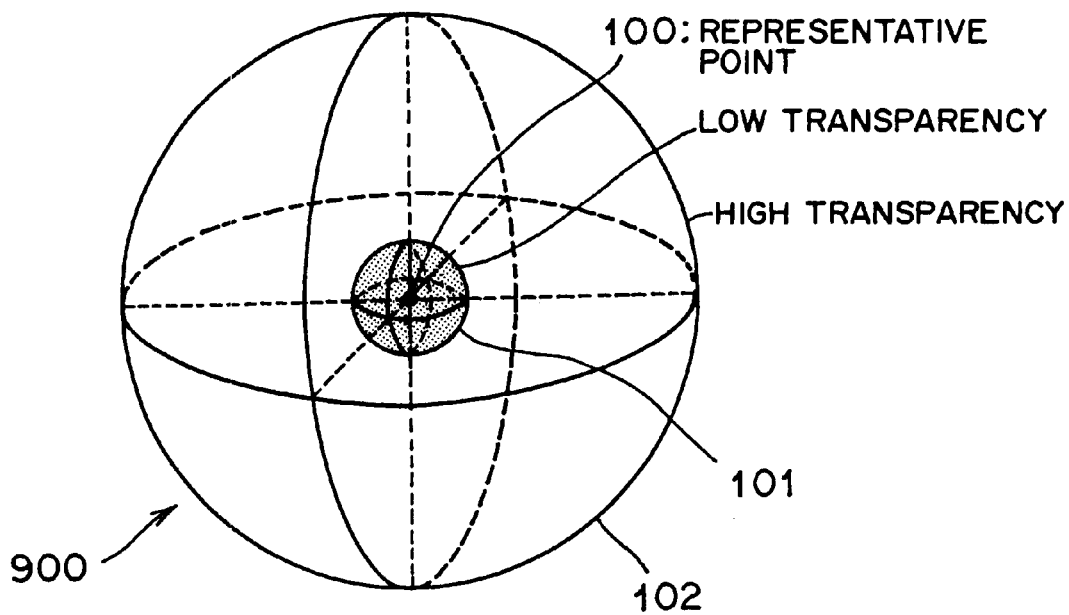
FIGS. 5A, 5B and 6A, 6B are diagrammatic views illustrating an interference check result displaying method according to a first embodiment of the present invention.
Figure 5B:
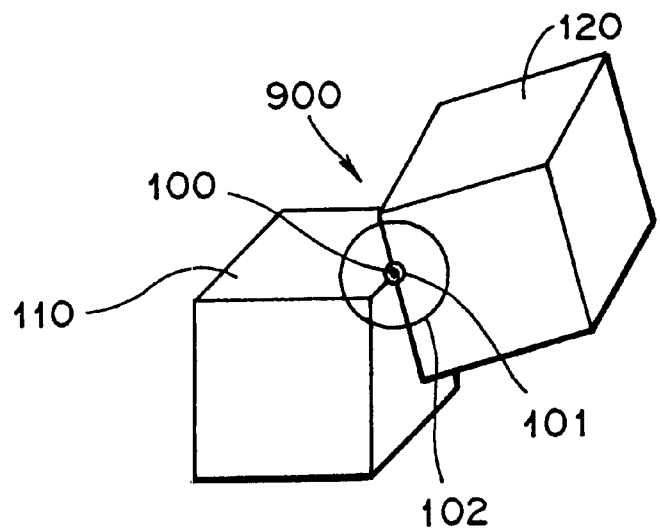

FIGS. 5A and 5B illustrate the interference check result displaying method of the first embodiment of the present invention, and particularly, FIG. 5A shows an interference condition displaying shape in an enlarged scale while FIG. 5B shows the displaying shape.

According to the interference check result displaying method of the first embodiment of the present invention, an interference occurrence mark 900 which is a shape indicating an interference occurrence condition is displayed as shown in FIG. 5A. The interference occurrence mark 900 is formed from a first sphere 101 displayed as a first shape which is a very small sphere of a comparatively low transparency centered at a representative point 100 and a second sphere 102 displayed as a second shape which is a sphere larger than the first sphere 101 and has a comparatively high transparency outside the first sphere 101 of the first shape. It is to be noted that different colors from each other are preferably used for the displays of the first sphere 101 and the second sphere 102.

According to the present displaying method, it is indicated that, as seen in FIG. 5B, interference occurs at the representative point 100 as a result of interference checking processing performed between an object model 110 and another object model 120. The first sphere 101 as the first shape indicates a precise position of the representative point 100, and the second sphere 102 as the second shape indicates a rough position of the representative point 100.

Figure 6A:
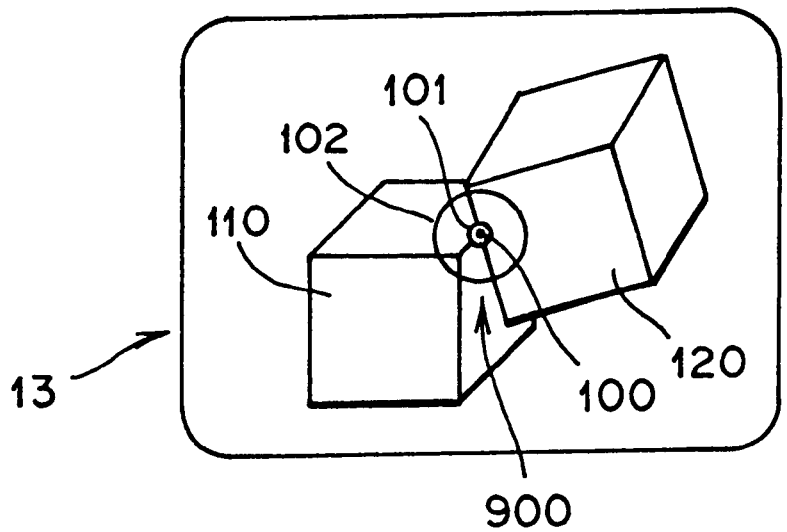
Figure 6B:
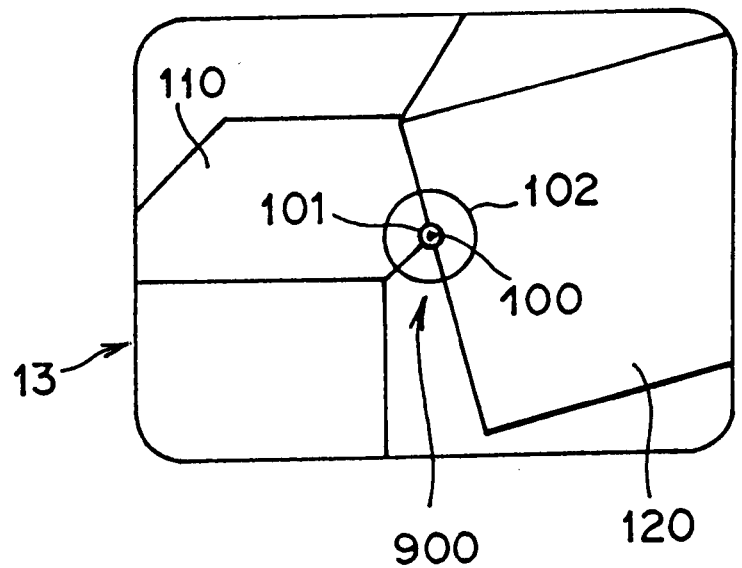

Also FIGS. 6A and 6B illustrate the interference check result displaying method of the first embodiment of the present invention and both illustrate a manner wherein a result of interference checking processing performed between the object model 110 and the object model 120 is displayed on the monitor 13. Particularly, FIG. 6A shows a result display shape of interference checking processing displayed together with an entire image of object models of an interference check subject, and FIG. 6B shows another result display shape of interference checking processing displayed together with an enlarged view of an interference occurring portion of FIG. 6A.

As seen in FIGS. 6A and 6B, the interference check result displaying method of the first embodiment of the present invention indicates that interference occurs at the representative point 100. The interference occurrence mark 900 is controlled by the interference condition shape production element 20 so that, also when the display magnification (zoom ratio) of the object models 110 and 120 displayed on the monitor 13 is varied, the interference occurrence mark 900 may always keep a fixed magnitude.

It is to be noted that the representative point 100 itself shown in FIGS. 5A, 5B and 6A, 6B is added for the convenience of illustration and description but is not actually displayed, and the precise position of the representative point 100 is indicated by the first sphere 101 as the first shape at all.

Since the interference check result displaying method of the first embodiment of the present invention is constructed in such a manner as described above, a result of interference checking processing performed by the interference checking unit 19 shown in FIG. 4 is sent to the image data formation unit 18, and the interference occurrence mark 900 is formed by the interference condition shape production element 20 of the image data formation unit 18.

Further, display image data are formed by the image data formation unit 18 so that the interference occurrence mark 900 formed by the interference condition shape production element 20 may be displayed together with image data of the object models 110 and 120, and an image of them is displayed on the monitor 13.

Figure 7:
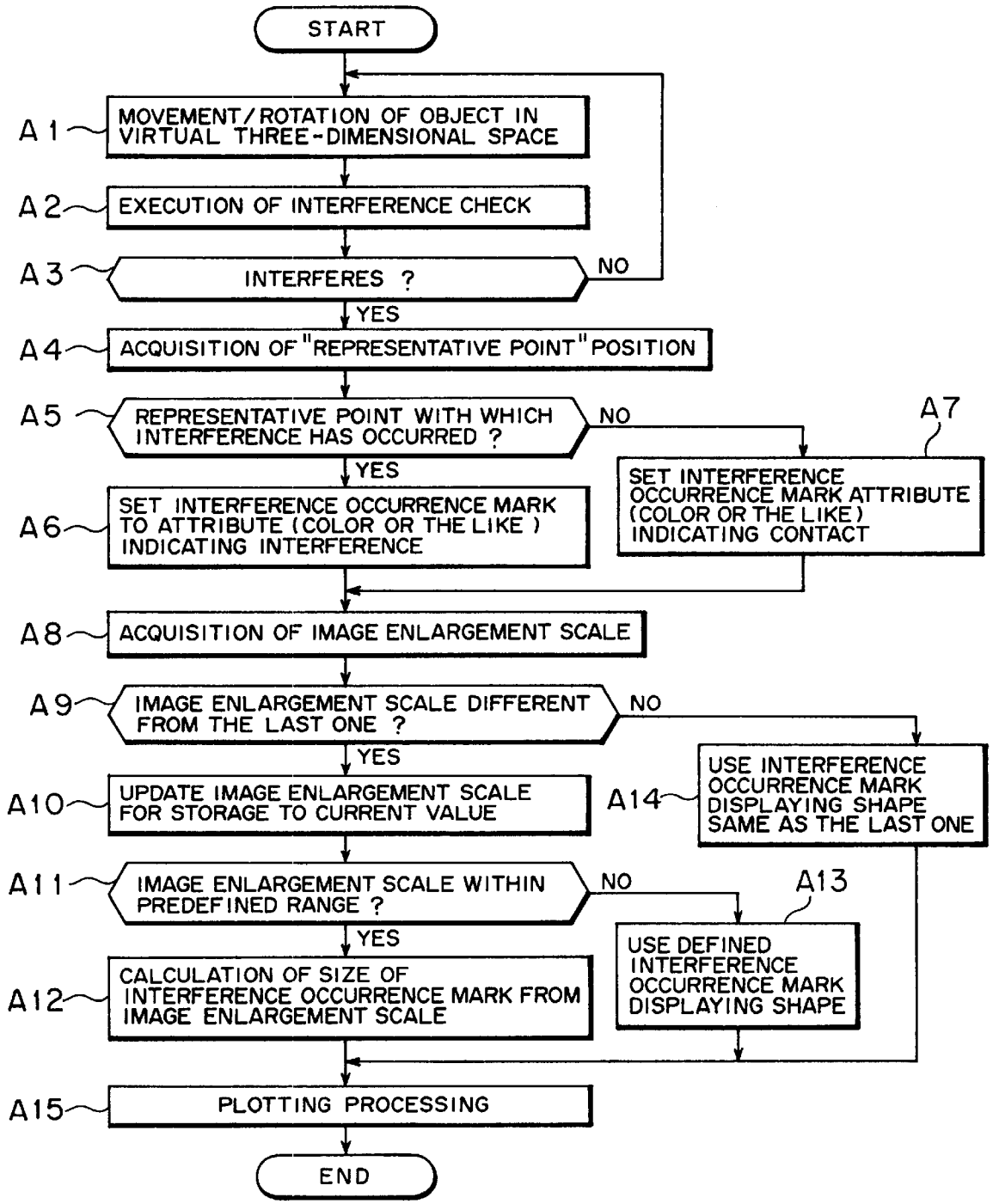
FIG. 7 is a flow chart illustrating the interference check result displaying method according to the first embodiment of the present invention.

FIG. 7 is a flow chart illustrating the interference check result displaying method of the first embodiment of the present invention. In the following, a manner wherein interference checking processing is performed and a result of the interference checking processing is displayed is described with reference to the flow chart (steps A1 to A15) shown in FIG. 7.

The object models 110 and 120 formed by the three-dimensional CAD system 16 and present in a virtual three-dimensional space are moved or rotated using the mouse 14 and the keyboard 15 (step A1). Further, as the object model 110 or 120 is moved or rotated using the mouse 14 and so forth, interference checking processing is performed by the interference checking unit 19 (step A2).

If a result of the interference checking processing by the interference checking unit 19 reveals that no contact/interference occurs (refer to the NO route of step A3), then the control returns to step A1. On the other hand, if the result reveals that interference occurs (refer to the YES route of step A3), information of the position of the representative point 100 and so forth are acquired as a result of the interference checking processing by the interference checking unit 19 (step A4), and the information of the representative point 100 is sent to the image data formation unit 18. Here, it is discriminated by the interference condition shape production element 20 of the image data formation unit 18 whether the result of the interference checking processing is interference or contact (step A5).

If it is discriminated here that the result of the interference checking processing is interference (refer to the YES route of step A5), then the interference occurrence mark 900 for indicating the representative point 100 on the monitor 13 is set to an attribute (display color and so forth) which indicates interference (step A6). On the other hand, if the result of the interference checking processing is contact (refer to the NO route of step A5), then the interference occurrence mark 900 for indicating the representative point 100 on the monitor 13 is set to an attribute (display color and so forth) which indicates contact (step A7).

Then, the image data formation unit 18 acquires information of a screen enlargement scale with which the object models 110 and 120 which are a subject of interference checking are to be displayed (step A8). Then, the image data formation unit 18 checks whether or not a screen enlargement scale which is different from a result of the last interference check result display has been inputted from the mouse 14, the keyboard 15 or the like (step A9).

If the inputted screen enlargement scale has been inputted newly from the mouse 14 or the keyboard 15 and is different from that when the interference check result display was performed in the last cycle (refer to the YES route of step A9), then the value of the screen enlargement scale stored in the storage unit 12 is updated to the value of the screen enlargement scale inputted in the present cycle by the general controller 17 (step A10).

Further, the general controller 17 checks whether or not the image enlargement scale set newly is within a predefined range (step A11). If the image enlargement scale set newly is within the predefined range (refer to the YES route of step A11), then the interference condition shape production element 20 calculates the size of the interference occurrence mark 900 indicating the representative point 100 so that it is displayed with a fixed size (step A12).

If the image enlargement scale set newly is not within the predefined range (refer to the NO route of step A11), then an interference condition display shape defined in advance is used by the interference condition shape production element 20 (step A13).

On the other hand, if the screen enlargement scale is equal to that used for the interference check result display of the preceding cycle (refer to the NO route of step A9), then image data of the interference occurrence mark 900 which were used for the display of the representative point 100 in the preceding cycle are used (step A14).

The image data of the interference occurrence mark 900 set in such a manner as described above are formed by the interference condition shape production element 20, and image data are formed by the image data formation unit 18 so that the interference occurrence mark 900 may be displayed together with the image data of the object models 110 and 120 and are displayed on the monitor 13 through the general controller 17 (step A15).

In this manner, according to the interference check result displaying method of the first embodiment of the present invention, since a rough position of the representative point 100 can be grasped from the second sphere 102 of the interference occurrence mark 900 which is larger than the first sphere 101 as the first shape and has a comparatively high transparency, occurrence of interference and the interference occurring position (representative point 100) can be recognized readily. Further, since the first sphere 101 whose shape is centered at the representative point 100 and which is small and has a comparatively low transparency is displayed, a precise position of the representative point 100 can be confirmed. Consequently, the operation efficiency in designing in which three-dimensional CAD is used can be improved.

Further, since the first sphere 101 whose shape is centered at the representative point 100 and which is small and has a comparatively low transparency is displayed and the second sphere 102 which is larger than the first sphere 101 and has a comparatively high transparency is displayed outside the first sphere 101, the position of the representative point 100 and a rough position with respect to the entire display can be indicated simultaneously, and an occurrence condition of interference can be grasped readily.

Further, according to the present interference check result displaying method, since the interference occurrence mark 900 is displayed always with a fixed size by the interference condition shape production element 20 irrespective of the display magnification (zoom ratio) of the object models 110 and 120 which are a subject of interference checking, even if enlargement and reduction of the screen display are repeated in designing in which three-dimensional CAD is used, an interference occurrence condition can be grasped readily also in a designing operation of a complicated apparatus without missing an interference position (the representative point 100).

B-1. First Modification to the First Embodiment

FIGS. 8A and 8B illustrate first and second modifications to the interference check result displaying method of the first embodiment of the present invention.

In particular, FIG. 8A is a front elevational view schematically showing a construction of an interference occurrence mark used in the modified method.

The interference occurrence mark 800 of the first modification to the interference check result displaying method of the first embodiment of the present invention is constructed such that, as shown in FIG. 8A, a plurality of pieces 201 having a triangular shape are arranged such that they extend radially from a representative point 100 and are each twisted by an angle $\theta_1$ around a center axis 201a thereof. The center of the pieces 201 indicates a precise position at which interference occurs, that is, a precise position of the representative point, and the radial regions formed by the pieces 201 indicate a rough position at which the interference occurs.

Further, the interference occurrence mark 800 is controlled by the interference condition shape production element 20 so that it can be visually observed with a fixed size on the monitor 13 which is a display unit. Consequently, also when the display magnification (zoom ratio) of the object models 110 and 120 to be displayed on the monitor 13 is varied, the interference occurrence mark 800 is displayed always with the fixed size, In this manner, according to the first modification to the interference check result displaying method of the first embodiment of the present invention, since a plurality of pieces 201 having a triangular shape are arranged such that they extend radially from a representative point 100 and radial regions formed by the pieces 201 indicate a rough position at which interference occurs, occurrence of interference and the interference occurrence position (representative point 100) can be recognized readily. Further, since the center of the pieces 201 indicates the precise position at which the interference occurs, the precise position of the representative point 100 can be formed. Consequently, the operation efficiency in designing in which three-dimensional CAD is used can be improved, and an occurrence condition of interference can be grasped readily.

Further, since the interference occurrence mark 800 is displayed always with a fixed size by the interference condition shape production element 20 irrespective of the display magnification (zoom ratio) of the object models 110 and 120 which are an object of interference checking, even if enlargement and reduction of the screen display are repeated in designing in which three-dimensional CAD is used, an interference occurrence condition can be grasped readily also in a designing operation of a complicated apparatus without missing an interference position (the representative point 100).

It is to be noted that, while, in the first modification to the interference check result displaying method of the first embodiment described above, each of the pieces 201 is arranged in a condition twisted by the angle $\theta_1$ around the center axis 201a thereof, the arrangement of the pieces 201 is not limited to this, and the pieces 201 may be arranged in a condition twisted by different angles around the respective center axes 201a while they extend radially from the center at the representative point 100.

B-2. Second Modification to the First Embodiment

FIG. 8B shows a second modification to the interference check result displaying method of the first embodiment of the present invention. In the second modification shown in FIG. 8B, an interference occurrence mark 810 includes a plurality of pieces 201 and 202 having a triangular shape and arranged such that they extend radially from a representative point 100.

The pieces 201 are each arranged in a condition twisted by a rotational angle $\theta_2$ around a center axis 201a thereof while the pieces 202 are each arranged in another condition twisted by another rotational angle $\theta_3$ around a central angle 202a thereof. The pieces 201 and 202 are arranged alternately such that they extend radially from the center provided by the representative point 100. In other words, the pieces 201 and the pieces 202 are displayed such that the displaying effects thereof are different from each other.

In this manner, according to the second modification to the interference check result displaying method of the first embodiment of the present invention illustrated in FIG. 8B, similar effects to those of the first embodiment can be achieved. Further, since the pieces 201 are each arranged in a condition twisted by the angle $\theta_2$ around the center axis 201a while the pieces 202 are each arranged in another condition twisted by the rotational angle $\theta_3$ around the central angle 202a thereof and the pieces 201 and 202 are arranged alternately such that they extend radially from the representative point 100, the visual discernibleness of the radial regions formed by the pieces 201 and 202 can be improved and an occurrence condition of interference can be grasped readily.

B-3. Third Modification to the First Embodiment

Figures 9A, 9B:
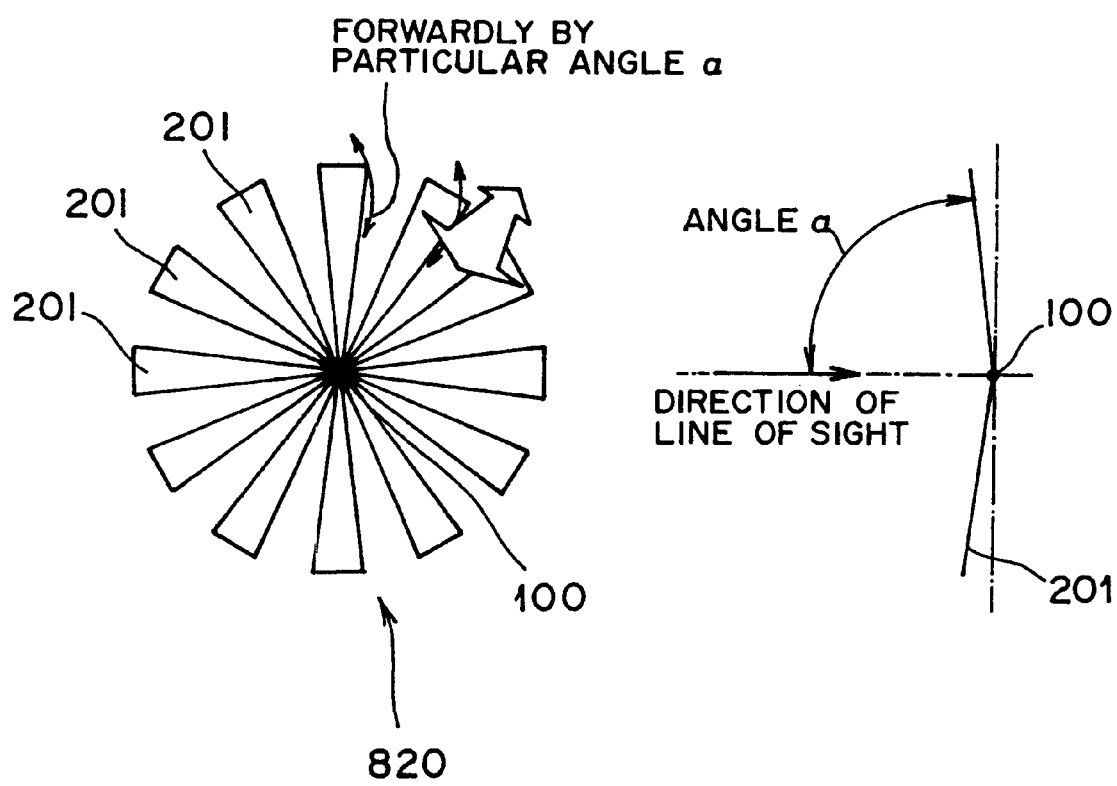
FIGS. 9A and 9B are diagrammatic views illustrating a third modification to the interference check result displaying method according to the first embodiment of the present invention.

FIGS. 9A and 9B illustrate a third modification to the interference check result displaying method of the first embodiment of the present invention. Particularly, FIG. 9A is a front elevational view schematically showing a construction of an interference condition displaying shape of the third modification and FIG. 9B is a side elevational view of the interference condition displaying shape of FIG. 9A.

Also in the third modification illustrated in FIGS. 9A and 9B, an interference occurrence mark 820 includes a plurality of pieces 201 having a triangular shape and arranged such that they extend radially from a representative point 100.

Also the interference occurrence mark 820 shown in FIGS. 9A and 9B are formed such that the pieces 201 are arranged to extend radially from the representative point 100. Further, the pieces 201 are arranged such that, as seen in FIG. 9B, they are inclined by an angle $\alpha$ toward a direction of a line of sight (leftward direction in FIG. 9B).

In this manner, also by the third modification to the interference check result displaying method of the first embodiment of the present invention shown in FIGS. 9A and 9B, similar effects to those of the modifications to the first embodiment described above can be achieved. Further, also from the fact that the pieces 201 are arranged such that they are inclined by the angle $\alpha$ toward the direction of the line of sight (leftward direction in FIG. 9B), the visual discernibleness can be improved, and an occurrence condition of interference can be grasped readily.

B-4. Fourth Modification to the First Embodiment

Figure 10A:
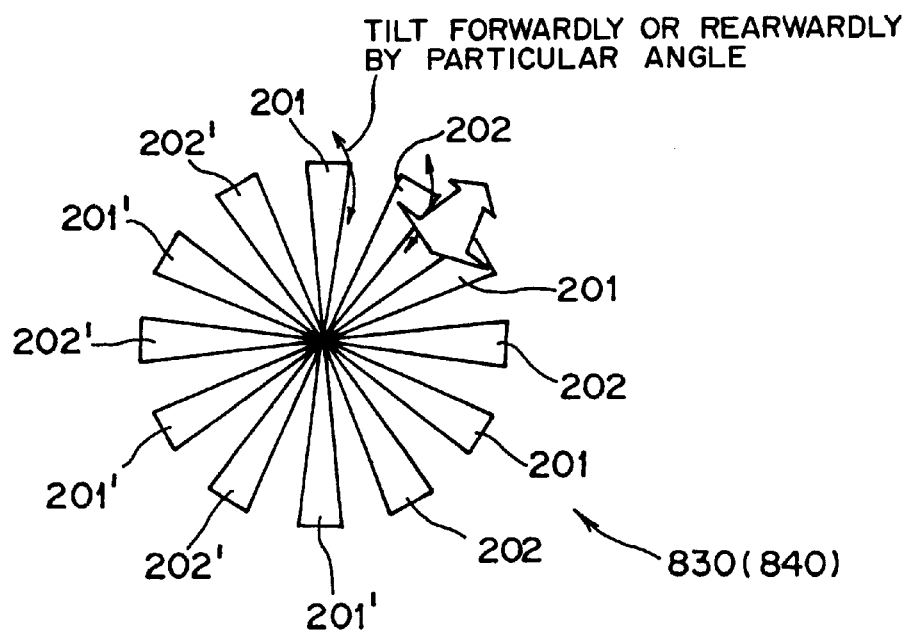
FIGS. 10A, 10B and 10C are diagrammatic views illustrating fourth and fifth modifications to the interference check result displaying method according to the first embodiment of the present invention.
Figure 10B:
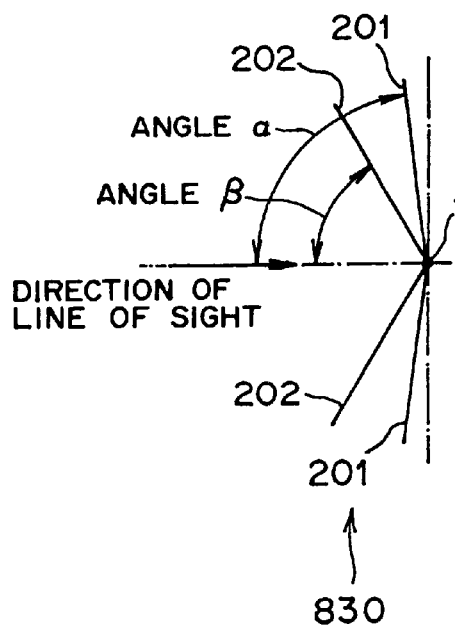
Figure 10C:
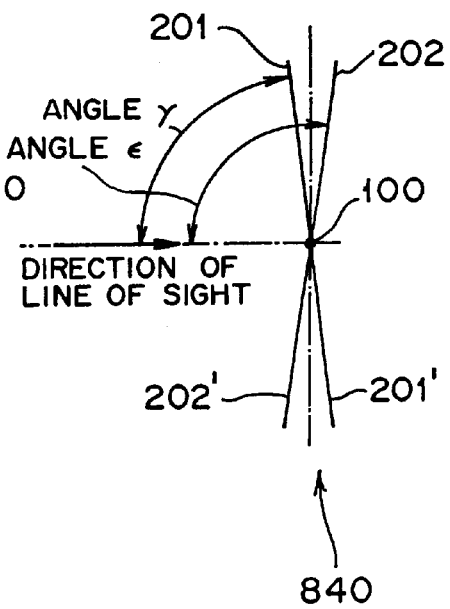

FIGS. 10A to 10C illustrate fourth and fifth modifications to the interference check result displaying method of the first embodiment of the present invention. Particularly, FIG. 10A is a front elevational view schematically showing a construction of an interference condition display shape of the fourth and fifth embodiments, and FIGS. 10B and 10C illustrate the fourth and fifth modifications, respectively, and are side elevational views of the interference condition display shape shown in FIG. 10A.

Also an interference occurrence mark 830 shown in FIGS. 10A and 10B is formed such that a plurality of pieces 201 and 202 having a triangular shape are arranged alternately such that they extend radially from a representative point 100.

The pieces 201 are each arranged such that it is inclined by an angle $\alpha$ toward a direction of a line of sight (leftward direction in FIG. 10B) while the pieces 202 are each arranged such that it is inclined by another angle $\beta$ toward the direction of the line of sight.

In this manner, also by the fourth modification to the interference check result displaying method of the first embodiment of the present invention shown in FIGS. 10A and 10B, similar effects to those of the modifications to the first embodiment described above can be achieved. Further, also from the fact that the interference occurrence mark 830 shown in FIGS. 10A and 10B is formed such that the pieces 201 and 202 are arranged alternately such that they extend radially from the representative point 100 and are arranged at different angles from each other toward the direction of the line of sight, the visual discernibleness of the radial regions formed by the pieces 201 and 202 can be improved, and an occurrence condition of interference can be grasped readily.

B-5. Fifth Modification to the First Embodiment

FIGS. 10A and 10C show an interference condition displaying shape of the fifth modification to the interference check result displaying method of the first embodiment of the present invention. Also an interference occurrence mark 840 shown in FIGS. 10A and 10C is formed such that a plurality of pieces 201, 201' and 202, 202' having a triangular shape are arranged alternately such that they extend radially from a representative point 100.

The pieces 201 are each arranged such that it is inclined by an angle $\gamma$ toward a direction of a line of sight (leftward direction in FIG. 10C), and the pieces 201' are arranged at positions symmetrical to the pieces 201 with respect to the representative point 100 such that they cooperate with the pieces 201 to define a common plane which passes the representative point 100.

Meanwhile, the pieces 202 are each arranged such that it is inclined by another angle $\epsilon$ toward the direction of the line of sight (leftward direction in FIG. 10C), and the pieces 202' are arranged at positions symmetrical to the pieces 202 with respect to the representative point 100 such that they cooperate with the pieces 202 to define a common plane which passes the representative point 100.

In this manner, also by the fifth modification to the interference check result displaying method of the first embodiment of the present invention shown in FIGS. 10A and 10C, similar effects to those of the modifications to the first embodiment described above can be achieved. Further, also from the fact that the interference occurrence mark 840 shown in FIGS. 10A and 10C is formed such that the pieces 201 and 202 are arranged alternately such that they extend radially from the representative point 100 and the pieces 201' and 202' are arranged at different angles from each other toward the direction of the line of sight, the visual discernibleness of the radial regions formed by the pieces 201' and 202' can be improved, and an occurrence condition of interference can be grasped readily.

It is to be noted that, while, in the modifications to the first embodiment described above, the pieces 201 (201') and the pieces 202 (202') are formed so as to have a triangular shape, the shape of them is not limited to this, and they may have a shape other than a triangular shape or they may be formed such that they are different from each other in shape, pattern or color or in combination of them. In this manner, they may be formed in various forms without departing from the scope and spirit of the present invention.

Further, while, in the fourth and fifth modifications to the first embodiment described above, the pieces 201 (201') and 202 (202') are arranged in different angles with respect to the direction of the line of sight while they are arranged alternately such that they extend radially from the representative point 100, the arrangement of them is not limited to this, and they may be formed such that they are different from each other in shape, size, pattern, color or reflectivity or they may be arranged such that they are different alternately in any of such attributes. In this manner, the arrangement of them may be varied in various manners without departing from the scope and spirit of the present invention. However, it is preferable to arrange them in some regularity.

It is to be noted that the pieces 201 (201') and/or 202 (202') may be displayed as a moving picture wherein each of them rotates around the center axis 201a or 202a thereof, or as another moving picture wherein they rotate around the representative point 100. In this manner, they may be carried out in various forms without departing from the scope and spirit of the present invention.

Further, while, in the third to fifth modifications to the first embodiment described above, the pieces 201 (201') and 202 (202') are arranged such that they are inclined toward the direction of the line of sight, the arrangement of them is not limited to this, and the pieces 201 (201') and 202 (202') arranged such that they are inclined toward the direction of the line of sight may each be twisted around the center axis 201a or 202a thereof. Further, in this instance, the pieces 201 (201') and 202 (202') maybe varied individually in shape, size, pattern, color, reflectivity or the like, or, they may be arranged such that they are different alternately in any of such attributes. In this manner, the arrangement of them may be varied in various manners without departing from the scope and spirit of the present invention. However, it is preferable to arrange them in some regularity.

Further, while, in the modifications to the first embodiment described above, a plurality of pieces are arranged such that they extend radially from a representative point in order to indicate a rough position of the representative point, the arrangement is not limited to this, and for example, concentric circular or spherical shapes centered at a representative point may be arranged. In this manner, the arrangement may be carried out in various forms without departing from the scope and spirit of the present invention.

C. Second Embodiment

When, in designing in which a three-dimensional CAD system is used, a result of interference checking processing performed between object models present in a virtual three-dimensional space is displayed on a display unit to grasp a positional relationship between the object models, it is sometimes important not only whether or not contact or interference occurs between the object models but also whether or not the object models are within a particular distance or range. An interference check result displaying method by which a distance or a relationship between nearest points of such object models is described with reference to the drawings.

Figure 11B:
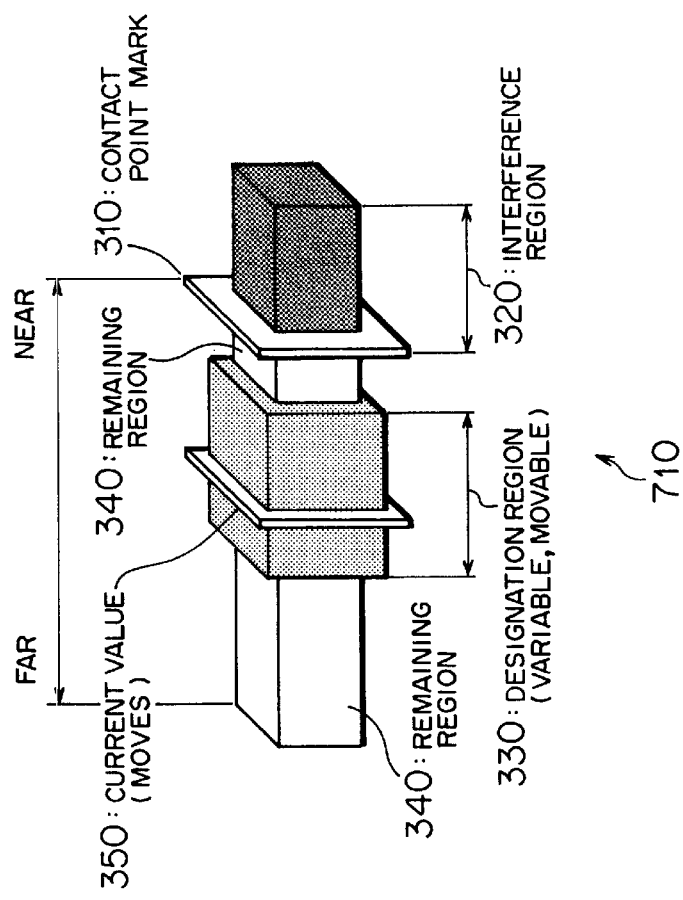
FIGS. 11A and 11B are diagrammatic views illustrating an interference check result displaying method according to the second embodiment of the present invention.
Figure 11A:
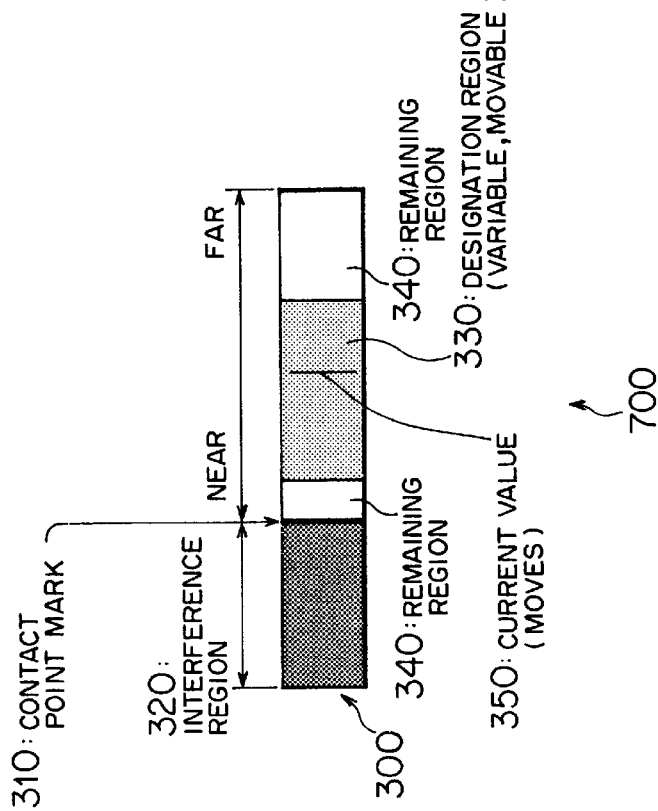
Figure 12:
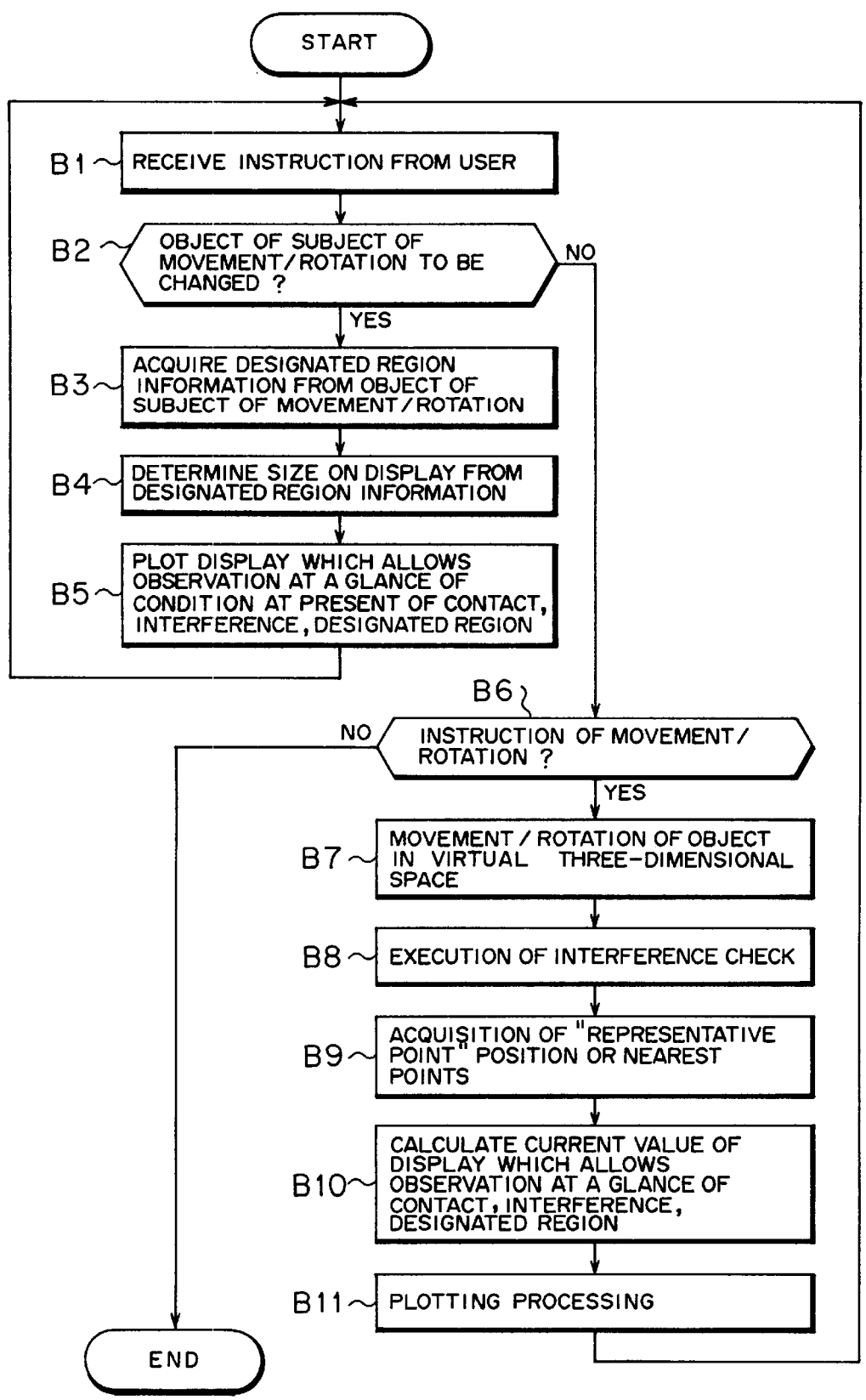
FIG. 12 is a flow chart illustrating the interference check result displaying method according to the first embodiment of the present invention.

FIGS. 11A, 11B, 12, 13A and 13B illustrate an interference check result displaying method of a second embodiment of the present invention. Particularly, FIGS. 11A and 11B are diagrammatic views illustrating the interference check result displaying method, FIG. 12 is a flow chart illustrating the interference check result displaying method, and FIGS. 13A and 13B are diagrammatic views schematically showing partially modified forms of interfering condition displaying shapes shown in FIGS. 11A and 11B, respectively.

An interference condition displaying shape 700 as a shape which is used to indicate an interference condition in the present interference check result displaying method is a variable shape which includes, as shown in FIG. 11A, a rectangular shape 300, a contact point mark 310, an interference region 320, a designation region 330, remaining regions 340, and a current value 350.

The rectangular shape 300 indicates a relationship between nearest points of object models, and the contact point mark 310 which is an index to a position at which contact occurs between object models is formed in the rectangular shape 300 such that it extends along a miner or shorter side of the rectangular shape 300.

A region of the rectangular shape 300 between the contact point mark 310 and one end of the rectangular shape 300 (left side end in FIG. 11A) is formed as the interference region 320, which functions as an index to a range in which interference occurs between objects.

Further, in a region of the rectangular shape 300 between the contact point mark 310 and the other end of the rectangular shape 300 (right side end in FIG. 11A), the designation region 330 which is an index to a range designated in advance is formed. The designation region 330 is a region which is set in advance when necessary in order to discriminate whether or not nearest points of object models which are an object of interference checking remain within a particular distance or range, and is formed as a variable and movable region.

Here, the expression that the designation region 330 is variable signifies that the range of the designation region 330 can be set arbitrarily, and signifies that, for example, it is possible to set the designation region 330 as a section wherein the distance the nearest points of object models ranges from 30 mm to 100 mm or to set the designation region 330 as a section wherein the distance between nearest points of object models ranges from 10 mm to 20 mm, and between the section wherein the nearest point distance is 30 mm to 100 mm and the section wherein the nearest point distance is 10 mm to 20 mm, the width of the shape of the designation region 330 displayed on the monitor 13 (that is, the length of the shape of the designation region 330 in the direction of the major axis of the rectangular shape 300) is different.

Meanwhile, the expression that the designation region 330 is movable signifies that the position of the designation region 330 can be set arbitrarily and signifies that, for example, while the section wherein the nearest point distance between object models is 90 mm to 10 mm and the section wherein the nearest point distance between object models is 10 mm to 20 mm are equal in the width of the shape of the designation region 330 displayed on the monitor 13 (that is, the length of the shape of the designation region 330 in the direction of the major axis of the rectangular shape 300), they are different in the position at which the designation region 330 is present.

Further, the current value 350 which represents a relative positional relationship between nearest points of object models displayed on the monitor 13 is displayed in the rectangular shape 300. The current value 350 is a variable shape representing a relationship between nearest points of object models as a result of interference checking processing by the interference checking unit 19, and moves in a direction of the major axis of the rectangular shape 300 (in the leftward or rightward direction in FIG. 11A) in the rectangular shape 300 as any of the object models moves or rotates in response to an operation of the mouse 14 or the keyboard 15.

Here, in a region other than the interference region 320 in the rectangular shape 300 of the interference condition displaying shape 700 shown in FIG. 11A, the current value 350 indicates that, as it approaches the interference region 320, that is, approaches the contact point mark 310, the nearest point distance between object models decreases, but as it is displaced away from the interference region 320, that is, away from the contact point mark 310, the nearest point distance between object models increases.

Further, the contact point mark 310, interference region 320, designation region 330, remaining regions 340 and current value 350 are displayed in different display colors, different patterns, different reflection factors or some other different attributes.

The interference condition displaying shape 700 described above is formed by the interference condition shape production element 20, and image data for displaying the interference condition displaying shape 700 on the monitor 13 is formed together with image data of object models by the image data formation unit 18. Further, the image data are displayed on the monitor 13 by the general controller 17.

In particular, in the present embodiment, the image data formation unit 18 and the general controller 17 correspond to the display control unit 4 shown in FIG. 2.

Since the interference condition displaying shape 700 of the second embodiment of the present invention is constructed in such a manner as described above, when an object model is moved or rotated using the mouse 14, the keyboard 15 or the like while interference checking processing is performed, a relationship between nearest points of object models is displayed on the monitor 13 by forming a positional relationship between a region of the contact point mark 310 or the designation region 330 of the rectangular shape 300 and the current value 350 by means of the interference condition shape production element 20 and forming image data by means of the image data formation unit 18 so that the positional relationship may be displayed together with the object models of the object of interference checking.

Here, the interference check result displaying method of the second embodiment of the present invention is described with reference to a flow chart (steps B1 to B11) shown in FIG. 12.

If an instruction to perform interference checking processing is received from an input from the mouse 14 or the keyboard 15 (step B1), then it is confirmed first whether or not an object model of an object which is to be moved or rotated should be changed from a currently selected object model to another object model (step B2).

If the object model to be moved or rotated should be changed (refer to the YES route of step B2), then information regarding the designation region 330 is acquired from the object model which is a subject of movement or rotation by the general controller 17 and so forth (step B3), and a relative size of the designation region 330 of the interference condition displaying shape 700 when the interference condition displaying shape 700 is to be displayed on the monitor 13 is determined based on the thus acquired information (step B4). It is to be noted that information regarding the designation region 330 may be inputted using the mouse 14, the keyboard 15 or the like.

Based on a result of the interference checking processing by the interference checking unit 19, such an interference condition displaying shape 700 as allows conditions of the contact point mark 310, interference region 320 and designation region 330 on the rectangular shape 300 to be observed at a glance is formed (step B5), and then the control returns to step B1 in order to wait for inputting of an instruction by the user.

On the other hand, when the object model to be moved or rotated should not be changed (refer to the NO route of step B2), then it is confirmed whether or not the object model should be moved or rotated (step B6). Then, if the object model should be moved or rotated (refer to the YES route of step B6), then movement or rotation of the object model present in the three-dimensional space displayed on the monitor 13 is performed using the mouse 14 or the keyboard 15 (step B7). On the other hand, if the object model should not be moved or rotated (refer to the NO route of step B6), then the process is ended.

After movement or rotation of the object model is performed using the mouse 14, the keyboard 15 or the like, interference checking processing is performed by the interference checking unit 19 (step B8). As a result of the interference checking processing by the interference checking unit 19, information of the position of a representative point or nearest points is acquired (step B9). In particular, if the result of the interference checking processing by the interference checking unit 19 indicates occurrence of interference or contact, then information of the position of a representative point is acquired, but if interference or contact does not occur, then nearest points of the object models are acquired.

Further, the information of the representative point or the nearest points is sent to the image data formation unit 18, and the position of the current value 350 in the interference condition displaying shape 700 and so forth are calculated by the interference condition shape production element 20 of the image data formation unit 18 so that the information may be displayed on the monitor 13 (step B10).

Based on the information calculated in this manner, an interference condition displaying shape 700 is formed by the interference condition shape production element 20, and image data are produced by the image data formation unit 18 so that the interference condition displaying shape 700 may be displayed together with an image of the object models. Then, the image data are displayed on the monitor 13 by the general controller 17 (step B11), whereafter the control returns to step B1 in order to wait for next inputting of an instruction by the user.

In this manner, according to the interference check result displaying method of the second embodiment of the present invention, since the current value 350 is displayed together with the contact point mark 310 and the interference region 320, the distance between the object models before interference or contact occurs can be observed at a glance. For example, even when any of the object models continuously moves, the positional relationship between the object models can be grasped readily and a manner in which interference occurs can be supervised continuously.

Further, where the current value 350 is displayed together with the contact point mark 310, designation region 330 and interference region 320, it can be confirmed at a glance whether or not the nearest points of the object models which are a subject of an interference check exist within a particular distance range. For example, even when the object models which are a subject of an interference check must be held at a fixed distance or a like case, the positional relationship between the object models can be grasped readily.

It is to be noted that, while, in the second embodiment described above, a relative positional relationship between nearest points of object models is indicated by the contact point mark 310, interference region 320, designation region 330 and current value 350 based on a result of an interference check by the interference checking unit 19, the indication is not limited to this, and the distance between nearest points or some other parameter may be displayed and it can be carried out in various forms without departing from the scope and spirit of the present invention.

Further, while, in the second embodiment described above, the current value 350 in the interference condition displaying shape 700 indicates that, as it moves rightwardly in FIG. 11A, the nearest point distance between the object models increases, the displaying manner of the direction of movement of the current value 350 is not limited by the direction such as the upward, downward, rightward or leftward direction or an oblique direction, and, as seen in FIG. 11B, the current value 350 in the interference condition displaying shape 700 may indicate that, as it moves leftwardly in FIG. 11B, the nearest point distance between the object models increases. In this manner, the displaying manner can be carried out in various manners without departing from the scope and spirit of the present invention.

Further, while, in the second embodiment described above, the interference condition display shape is formed from a planar rectangular shape, it is not limited to this, and it can be carried out in various forms without departing from the scope and spirit of the present invention.

For example, the interference condition display shape may be displayed three-dimensionally like an interference condition displaying shape 710 shown in FIG. 11B or may be displayed such that, as the nearest point distance between object models increases, the length in the direction of the minor axis increases like interference condition displaying shapes 700' and 710' shown in FIGS. 13A and 13B, respectively. It is to be noted that, in the interference condition displaying shapes 700, 700' and 710, 710' shown in FIGS. 13A and 13B, the designation region 330 is omitted for the convenience of illustration.

Further, as means for indicating a perspective (near and far) direction of an interference condition displaying shape, a similar effect may be provided to the interference condition displaying shape by displaying the interference condition displaying shape in a perspective fashion so that the display size may decrease as the distance to the farther side increases.

Figure 14B:
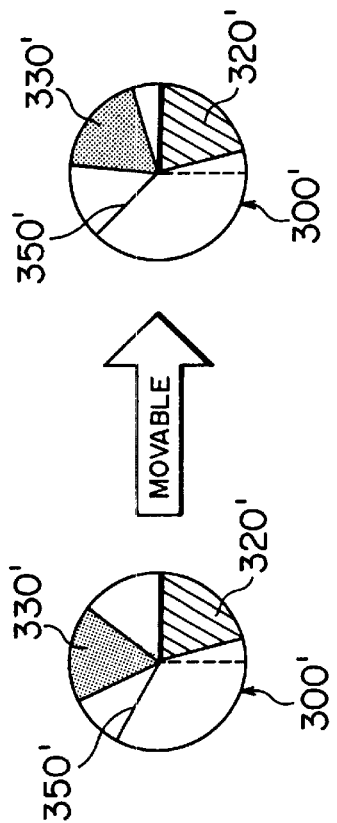
Figure 14C:
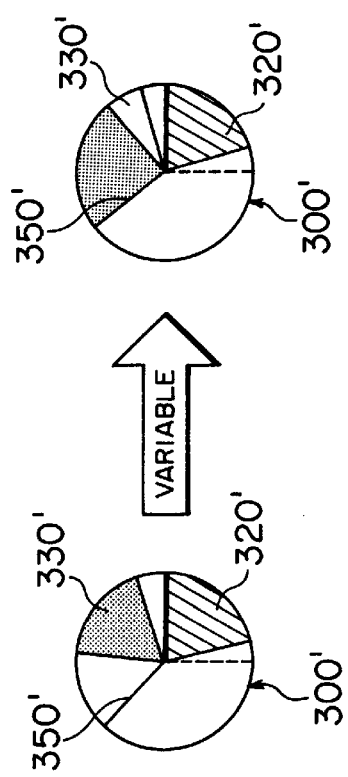
Figure 14A:
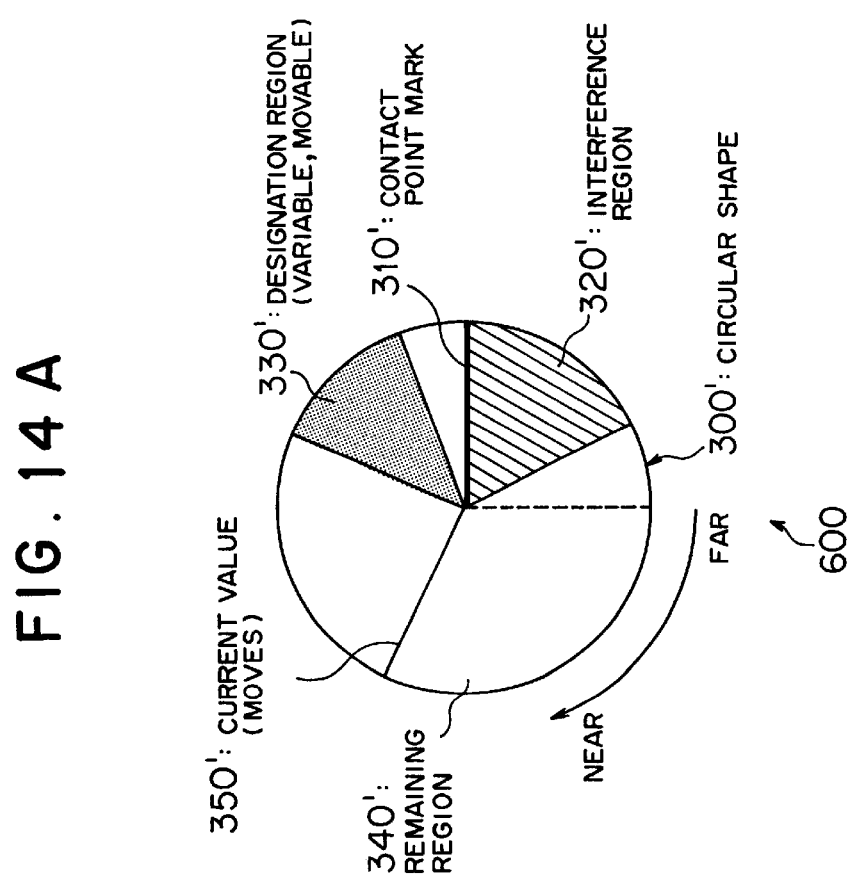

Further, the interference condition displaying shape may be formed in a circular shape as seen in FIGS. 14A to 14C and 15A to 15C. FIGS. 14A to 14C and 15A to 15C illustrate modifications to the interference check result displaying method of the second embodiment of the present invention, and particularly, FIG. 14A shows the interference condition display shape used in the modified method while FIGS. 14B and 14C show different examples of the display of the interference condition displaying shape and FIGS. 15A to 15C illustrate the interference check result displaying method.

The interference condition displaying shape 600 shown in FIGS. 14A to 14C and 15A to 15C is a modification to the interference condition displaying shape of the interference check result displaying method of the present invention illustrated in FIGS. 11A and 11B in that it has a circular shape. An interference region 320', a designation region 330', an remaining region 340' and so forth are formed on the circle individually in sectoral shapes around the center of the circle as particularly seen in FIG. 14A.

FIG. 14B illustrates a manner wherein the designation region 330' of the interference condition displaying shape having such a circular shape is movable and also illustrates a manner wherein the position of the designation region 330' can be varied arbitrarily. Meanwhile, FIG. 14C illustrates a manner wherein the designation region 330' of the interference condition displaying shape 600 having a circular shape is variable and illustrates a manner wherein the range of the designation region 330' can be varied arbitrarily.

FIGS. 15A to 15C illustrate different manners wherein the interference check result displaying method of the second embodiment of the present invention is displayed on the monitor 13. In FIGS. 15A to 15C, the interference condition displaying shape is displayed together with object models 110 and 120, which are a subject of an interference check, on the monitor 13.

When the object models 110 and 120 which are a subject of an interference check are spaced away sufficiently from each other, the current value 350' in the interference condition displaying shape is positioned in the remaining region 340' as seen in FIG. 15A, and as the object models 110 and 120 approach each other, the current value 350' moves clockwise toward the contact point mark 310'.

When the object models 110 and 120 approach each other until the nearest point distance between the object models 110 and 120 comes within a range set in advance, the current value 350' of the interference condition display shape is positioned in the designation region 330' as seen in FIG. 15B.

When the object models 110 and 120 further approach each other until interference occurs between them, the current value 350' of the interference condition display shape is positioned in the interference region 320' as seen in FIG. 15C. Further, in this instance, the interference condition displaying shape shown in FIG. 5B is displayed at the interference occurring position.

D. Third Embodiment

Figure 16:
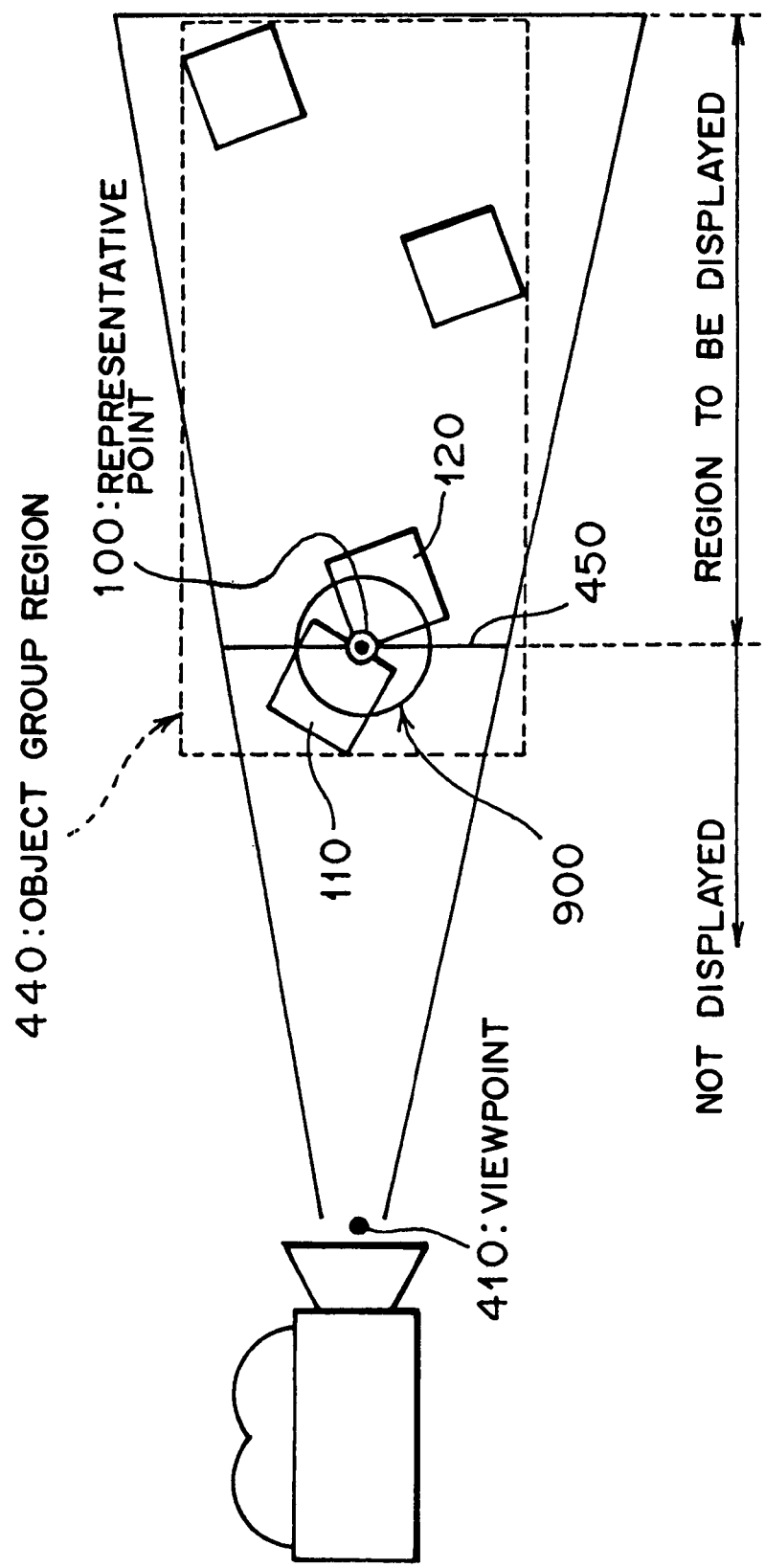
FIG. 16 is a diagrammatic view illustrating an interference check result displaying method according to the third embodiment of the present invention.
Figure 17B:
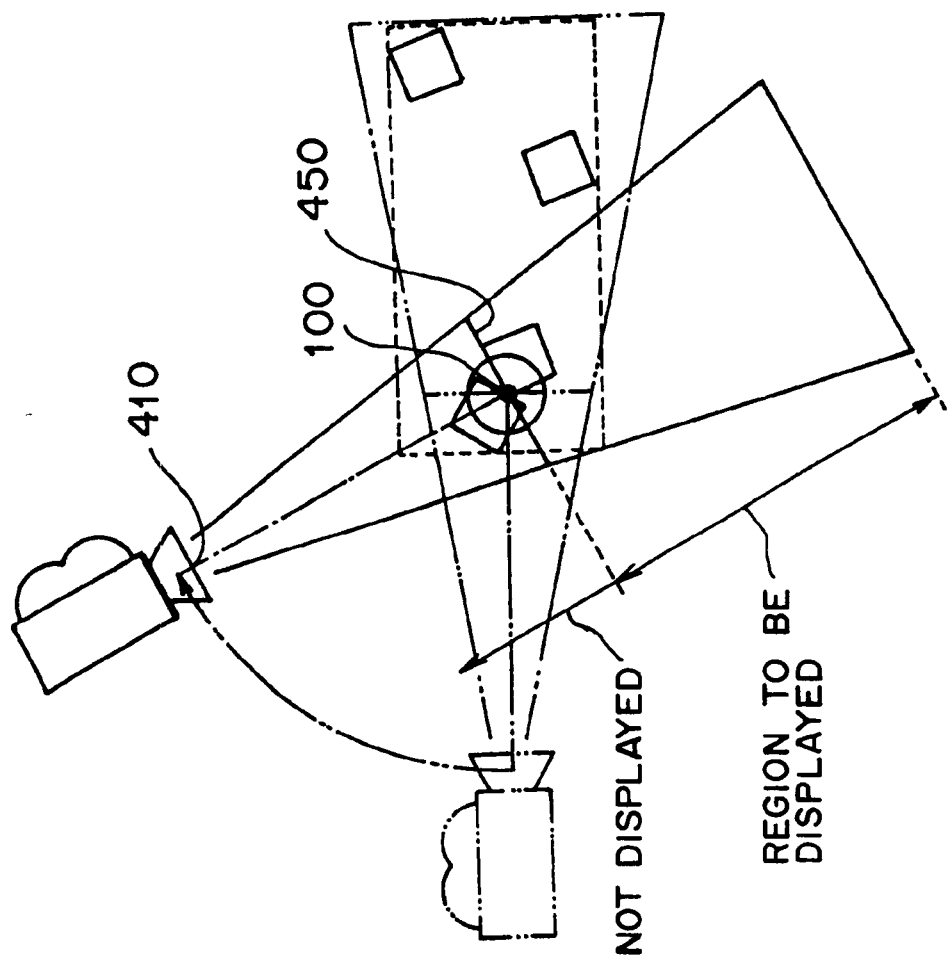
FIGS. 17A and 17B, 18A to 18C and 19A and 19B are diagrammatic views illustrating the interference check result displaying method according to the third embodiment of the present invention.
Figure 17A:
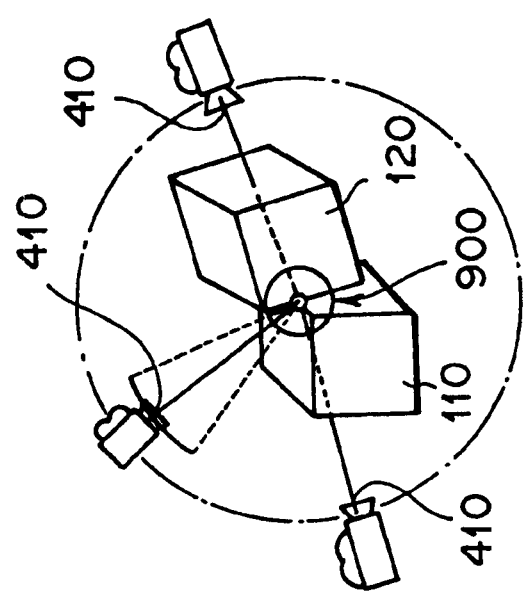
Figure 18A:
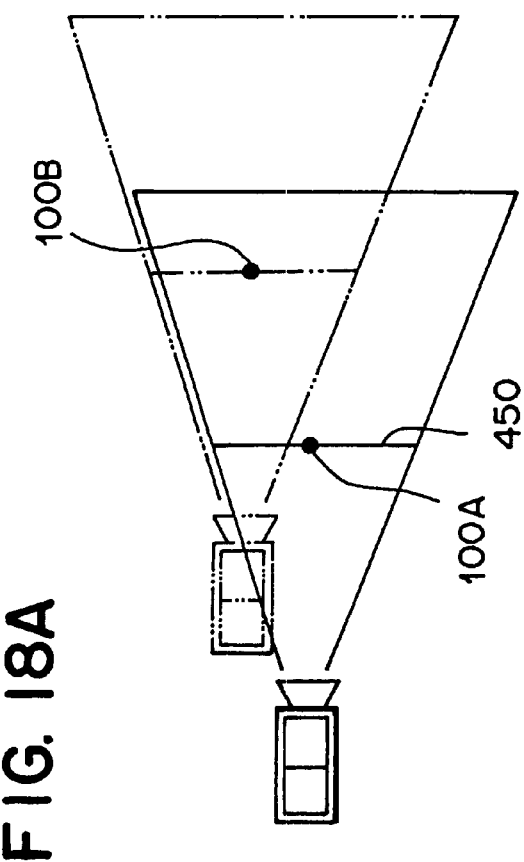
Figure 18B:
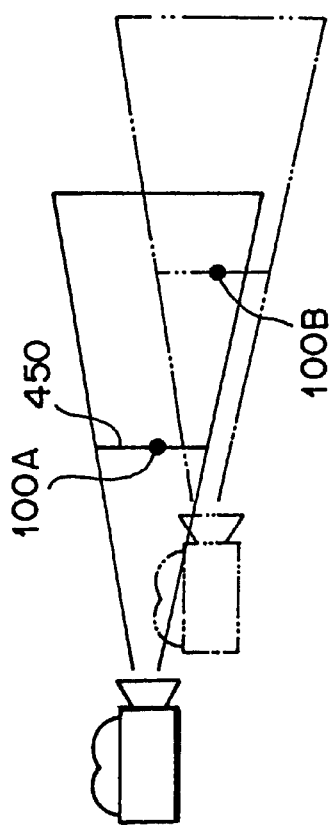
Figure 18C:
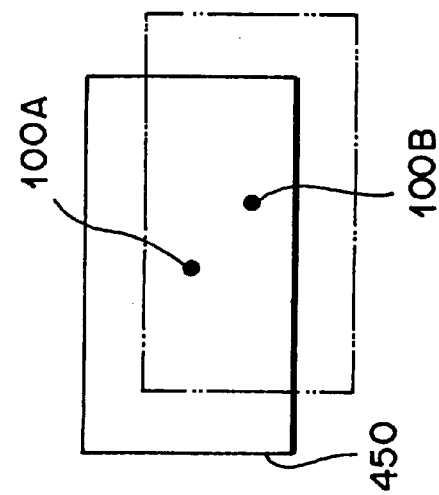
Figure 19A:
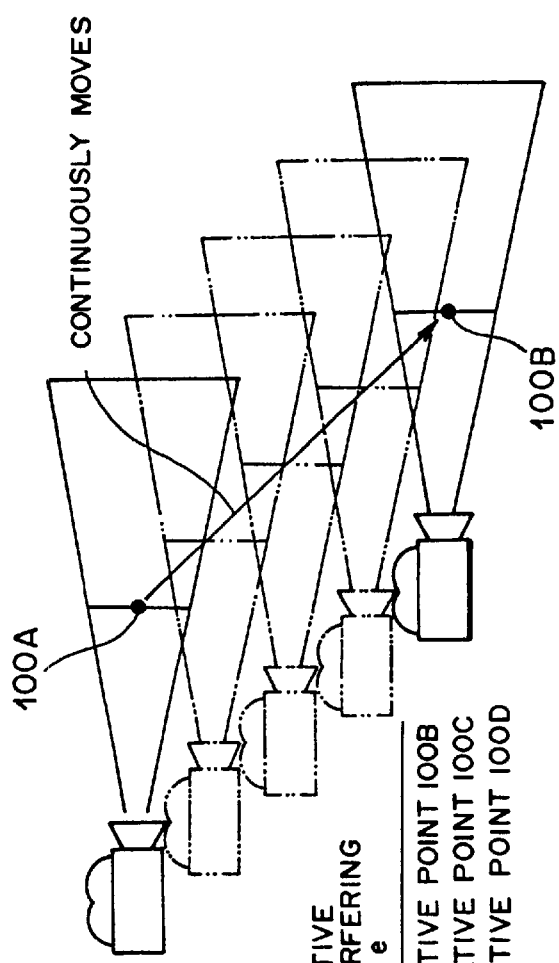
Figure 19B:
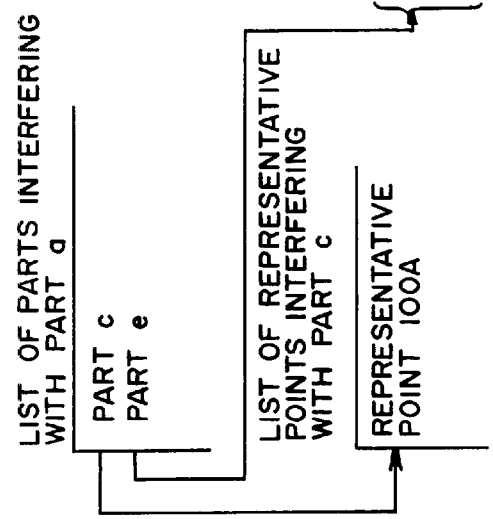

FIGS. 16 through 19A and 19B illustrate an interference check result displaying method of a third embodiment of the present invention. More particularly, FIG. 16 is a diagrammatic view illustrating the interference check result displaying method according to the third embodiment of the present invention, FIG. 17A is a diagrammatic view schematically illustrating the entire interference check result displaying method of the third embodiment of the present invention, FIG. 17B is an enlarged diagrammatic view illustrating the interference check result displaying method, FIGS. 18A, 18B and 18C are a top plan view, a front elevational view and a side elevational view, respectively, illustrating the interference check result displaying method when a plurality of representative points are involved, FIG. 19A is a diagrammatic view showing a list indicating a plurality of representative points, and FIG. 19B is a diagrammatic view illustrating the interference check result displaying method where a plurality of representative points are involves.

According to the interference check result displaying method of the third embodiment of the present invention, when a representative point 100 is formed as a result of interference checking processing between object models 110 and 120, the representative point 100 is displayed as a particular point (observation point) together with a cross section 450 on the monitor 13 which is a display unit as shown in FIG. 16.

The cross section 450 is a displayed cross section calculated with reference to a viewpoint 410 for viewing the representative point 100 in a virtual three-dimensional space and an object group region 440 which is a region occupied by the object models 110 and 120 in the three-dimensional space, and is formed as a plane which passes the representative point 100 and extends perpendicularly to a straight line interconnecting the viewpoint 410 and the representative point 100.

Further, the interference condition shape production element 20 controls so that the space between the cross section 450 and the viewpoint 410 is not displayed on the monitor 13 and a region opposite to the viewpoint 410 with respect to the cross section 450 (that is, on the right side in FIG. 16) is displayed on the monitor 13. This cross section 450 corresponds to a shape which indicates an interference occurrence condition.

Further, in the present embodiment, the general controller 17 and the image data formation unit 18 correspond to the display control unit 6 shown in FIG. 3, and the interference condition shape production element 20 corresponds to the cross section calculation unit 62 shown in FIG. 3 while the image data formation unit 18 corresponds to the discrimination allowing display control unit 61.

It is to be noted that, in FIG. 16, the representative point 100 is indicated by the interference occurrence mark 900 shown in FIG. 5A.

Further, in the present interference check result displaying method, the viewpoint 410 can be moved on a spherical face centered at the representative point 100 as seen in FIG. 17A. Also in this instance, the interference condition shape production element 20 controls so that the space between the cross section 450 and the viewpoint 410 is not displayed on the monitor 13 and a region opposite to the viewpoint 410 with respect to the cross section 450 is displayed on the monitor 13 as seen in FIG. 17B.

Here, if the viewpoint 410 is moved on the spherical face centered at the representative point 100 using the mouse 14, the keyboard 15 or the like, then image data of the cross section 450 which passes the representative point 100 is formed by the image data formation unit 18 and is displayed on the monitor 13 by the general controller 17.

It is to be noted that, also in FIGS. 17A and 17B, the representative point 100 is indicated using the interference occurrence mark 900 shown in FIG. 5A.

Further, when interference checking processing of a complicated object model or interference checking processing among a plurality of object models is to be performed, a plurality of representative points may possibly be present as interference or contact occurs at a plurality of locations.

Where a plurality of representative point 100A and 100B are present in a virtual three-dimensional space as shown in FIGS. 18A to 18C, when it is intended to perform confirmation of a contact/interference condition at the representative point 100B after a contact/interference condition at the representative point 100A is confirmed, the observation point is changed over from the representative point 100A to the representative point 100B using the mouse 14 or the keyboard 15.

Further, in order to make it possible to distinguish the designated observation point (representative point 100B) from the other representative point 100A, the interference occurrence mark 900 indicating the representative point 100B is displayed so as to allow distinction thereof from the interference occurrence mark 900 which indicates the representative point 100A by such means as changing the displaying color. In particular, any of such interference occurrence marks as shown in FIGS. 8A through 10C may be used and the color, size, shape or the like of the interference occurrence mark at the observation point should be changed.

It is to be noted that, in FIGS. 18A through 19B, the interference occurrence mark for indicating the representative point 100 is omitted for the convenience of illustration.

Where a plurality of representative points are involved, a representative point 100 with regard to which an interference condition is to be confirmed, that is, a representative point 100 which is to make an observation point, is selected from among the plurality of representative points 100. Here, the selection may be set in advance so that all of the representative points 100 are successively designated automatically, or the plurality of representative points 100 are displayed in a list as seen in FIG. 19A so that a particular one point may be designated as a particular point (observation point) from within the list.

The list shown in FIG. 19A indicates a result of interference checking processing in a hierarchical structure such that, for example, as parts which interfere with a part a, a part c and another part e are displayed, and as a representative point which interferes with the part c, the representative point 100A is displayed. Further, as representative points for which interference checking processing with the part e has been performed, representative point 100B, 100C and 100D are displayed.

Further, a suitable solid such as a cube, a rectangular parallelepiped or a sphere may be arranged in the virtual three-dimensional space such that narrowing down of the representative points 100 is performed depending upon whether or not each of them is present in the solid.

After the narrowing down of representative points 100 which may make an observation point is performed, one of the representative points 100 is selected as an observation point using the mouse 14 or the keyboard 15.

Here, in order to confirm a contact/interference condition through the monitor 13, the observation point may be varied while the position of the viewing point is kept as it is, or the observation point maybe varied while also the viewing point is moved in accordance with the variation of the observation point, and an image for confirmation of an interference check result is produced by the image data formation unit 18 and displayed on the monitor 13 through the general controller 17.

In formation of image data by the image data formation unit 18, if the observation point is changed to another representative point 100, then a cross section at the representative point 100 after the change to be displayed is calculated and moved on the display while the visual continuity on the display and a particular restriction condition are kept.

In particular, when the representative point 100A is first set as the observation point and then the representative point 100B is set as the next observation point, in order to confirm a manner of interference at the observation points using the cross section 450, not an image of the cross section 450 for confirmation of interference at the representative point 100B is displayed subsequently to an image of the cross section 450 for confirmation of interference at the representative point 100A, but the cross section 450 is moved on the display while keeping the visual continuity based on a step size which is calculated from regions of object models displayed in the virtual three-dimensional space, the distance between the representative points 100, the magnification of the images and so forth.

For example, where the distance between the representative point 100A and the representative point 100B is 200 mm and the magnification of the images is 1, the image of the cross section 450 is formed such that the amount of movement or step size when the observation point is successively moved from the representative point 100A to the representative point 100B on the display is 20 mm, but where the magnification of the images is 0.8, the image is formed such that the amount of movement is 50 mm.

Further, depending upon the enlargement scale of the images, preferably the original enlargement scale is restored after the enlargement scale is returned to its predefined value and the observation point is moved on the display with the predefined enlargement scale.

In the construction described above, a condition of interference at a representative point 100 is confirmed by displaying the cross section 450, which passes the representative point 100, on the monitor 13. Where a plurality of representative points 100 are involved, the observation point is successively moved while the cross sections 450 of the plurality of representative points 100 are successively displayed to confirm interference conditions of them. Further, also when the observation point is moved to display interference conditions of the individual representative points 100, the cross section 450 is moved on the display while keeping the visual continuity to confirm contact/interference conditions.

Here, a process of changing the observation point from the representative point 100A to the representative point 100B as seen in FIG. 19B to confirm interference conditions is described with reference to a flow chart (steps C1 to C17) shown in FIG. 20.

First, for example, from within the list of interfering representative points displayed on the monitor 13, the representative point 100B to be designated as an observation point is selected using the mouse 14 or the keyboard 15 (step C1). The distance between the current observation point (representative point 100A) and the selected observation point (representative point 100B) is calculated and image data of a region occupied by the object models in the virtual three-dimensional space are acquired in order to display the cross section 450 (step C2).

Further, data of the image enlargement scale for image data set to be displayed on the monitor 13 at present is acquired, and the image enlargement scale is stored as an image enlargement scale A into the storage unit 12 by the image data formation unit 18 and the general controller 17 (step C3).

Further, it is discriminated whether or not the acquired image enlargement scale A is within a predefined value range set in advance (step C4), and if the image enlargement scale A is not within the predefined value range (refer to the NO route of step C4), then a step size is calculated from the image enlargement scale A (step C6).

Then, the image enlargement scale is varied by the image data formation unit 18 based on the step size calculated in step C6 (step C7), and image data is formed (step C8). Then, it is discriminated whether or not the newly set image enlargement scale is within the predefined range (step C9). If the enlargement scale is not within the predefined range (refer to the NO route of step C9), then the control returns to step C7.

If the image enlargement scale is within the predefined range (refer to the YES route of step C4) or is changed into the predefined enlargement scale (refer to the YES route of step C9), then a step size of movement when the cross section 450 is moved on the display is calculated based on the distance between the observation point at present and the selected observation point calculated in step C2 and the image enlargement scale at present (step C5).

The cross section 450 is moved in accordance with the step size of movement (step C10), and then, image data of the cross section 450 is formed by the image data formation unit 18 (step C11). Further, it is discriminated whether or not the cross section 450 has moved by the distance between the representative point 100A and the representative point 100B (representative point distance) calculated in step C2 (step C12). Thus, the operation in steps C10 to C12 is repeated until after the cross section 450 moves by the representative point distance (refer to the NO route of step C12).

After the cross section 450 moves by the representative point distance and comes to the representative point 100B which is the observation point of the destination of movement (refer to the YES route of step C12), the image enlargement scale at present is compared with the image enlargement scale A set in step C3 to discriminate whether or not they are equal to each other (step C13). If they are not equal to each other (refer to the NO route of step C13), then the operation in steps C6 to C9 is performed in the reverse order.

In particular, a step size is calculated from the image enlargement scale at present (step C14), and the image enlargement scale is varied by the image data formation unit 18 based on the step size calculated in step C14 (step C15) and image data is formed (step C16). Here, it is discriminated whether or not the image enlargement scale at present is equal to the image enlargement scale A acquired in step C3 (step C17). If the image enlargement scale at present is not equal to the image enlargement scale A (refer to the NO route of step C17), then the control returns to step C15.

If the image enlargement scale at present is equal to the image enlargement scale A (refer to the YES route of step C13) or becomes equal to the image enlargement scale A (refer to the YES route of step C17), then an interference condition at the representative point 100B is displayed in the enlargement scale equal to that prior to the variation of the observation point on the display screen displayed on the monitor 13, thereby ending the movement of the observation point on the display.

In this manner, according to the contents of the third embodiment of the present invention, by designating a representative point 100 as an observation point and displaying the observation point together with the cross section 450, a contact/interference condition at the representative point 100 can be grasped readily.

Further, also when a result of interference checking processing proves that a plurality of representative points 100 appear, by displaying the plurality of representative points 100 in the form of a list, designating one of the representative points 100 whose interference condition is to be confirmed as an observation point from within the list and displaying the observation point distinctly from the other representative point 100, an interference condition can be confirmed readily with regard to an object model having a complicated profile, and the efficiency in designing operation can be raised.

Further, when a result of interference checking processing proves that a plurality of representative points 100 appear and the observation point is to be moved so that interference conditions of the individual representative points 100 are successively displayed, by moving the cross section 450 on the display while keeping the visual continuity, the interference conditions can be grasped readily, and the current position on the image displayed on the monitor 13 is not missed. Further, even when a plurality of representative points 100 are present, an interference condition can be confirmed efficiently.

Further, when the cross section 450 is to be displayed to confirm an interference condition of a representative point 100, each time the viewpoint 410 is moved on the spherical face centered at the representative point 100 using the mouse 14 or the keyboard 15, the cross section 450 is calculated and displayed by the image data formation unit 18. Consequently, also an interference condition which is disturbed from being displayed by some other part or the like and should not originally be displayed on the monitor 13 can be displayed, and improvement in efficiency in designing operation can be achieved. Further, an occurrence condition of interference can be grasped in the designing stage, and reduction in cost by reduction in steps for trial manufacture can be promoted.

Further, even if a result of interference checking processing proves that a plurality of representative points 100 appear, when the cross section 450 is displayed to confirm an interference condition at a representative point 100, each time the viewpoint 410 is moved on the spherical face centered at the representative point 100 using the mouse 14 or the keyboard 15, the cross section 450 is calculated and displayed by the image data formation unit 18. Consequently, also a representative point 100 which is present in the inside of a complicated equipment, apparatus or the like can be confirmed.

Further, where a result of interference checking processing proves that a plurality of representative points 100 appear, if the image enlargement scale is not within a predefined range when the observation point is moved to display an interference condition at each representative point 100, by returning the enlargement scale to its predefined value once and moving the observation point on the display with the predefined enlargement scale and then restoring the original enlargement scale after completion of the movement on the display, an interference condition can be displayed always at an optimum image enlargement scale on the monitor 13, and an interference condition can be grasped further readily.

E. Others

It is to be noted that, while, in the embodiments described above, the three-dimensional CAD system 16 operates on the storage unit 12, the apparatus on which the three-dimensional CAD system 16 operates is not limited to this, and the three-dimensional CAD system 16 may operate on some other computer and can be carried out in various forms without departing from the spirit and scope of the present invention.

Figure 21:
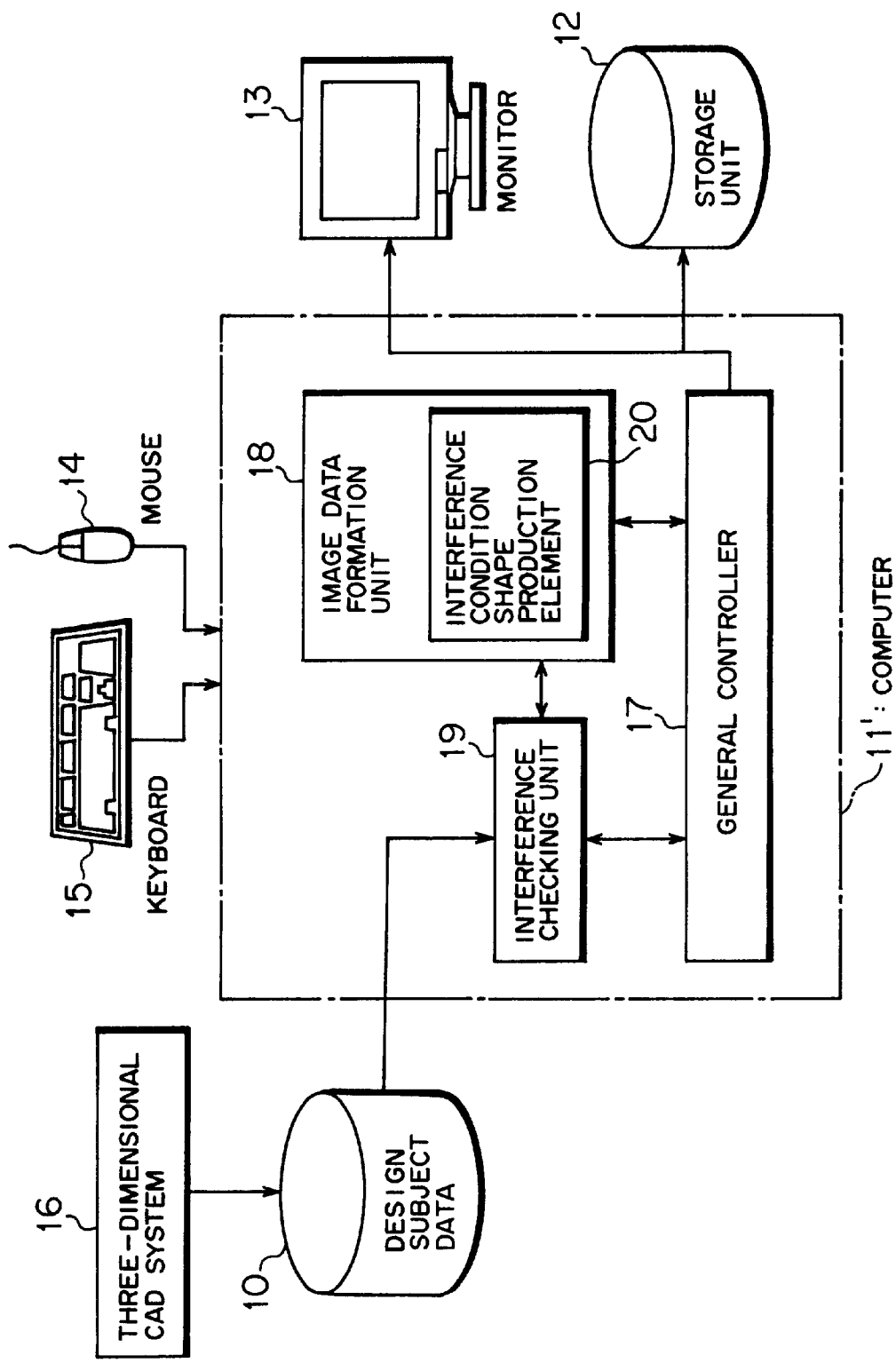
FIG. 21 is a block diagram showing a hardware construction and a functional construction of a modification to the interference check result displaying apparatus shown in FIG. 4.
Figure 22:
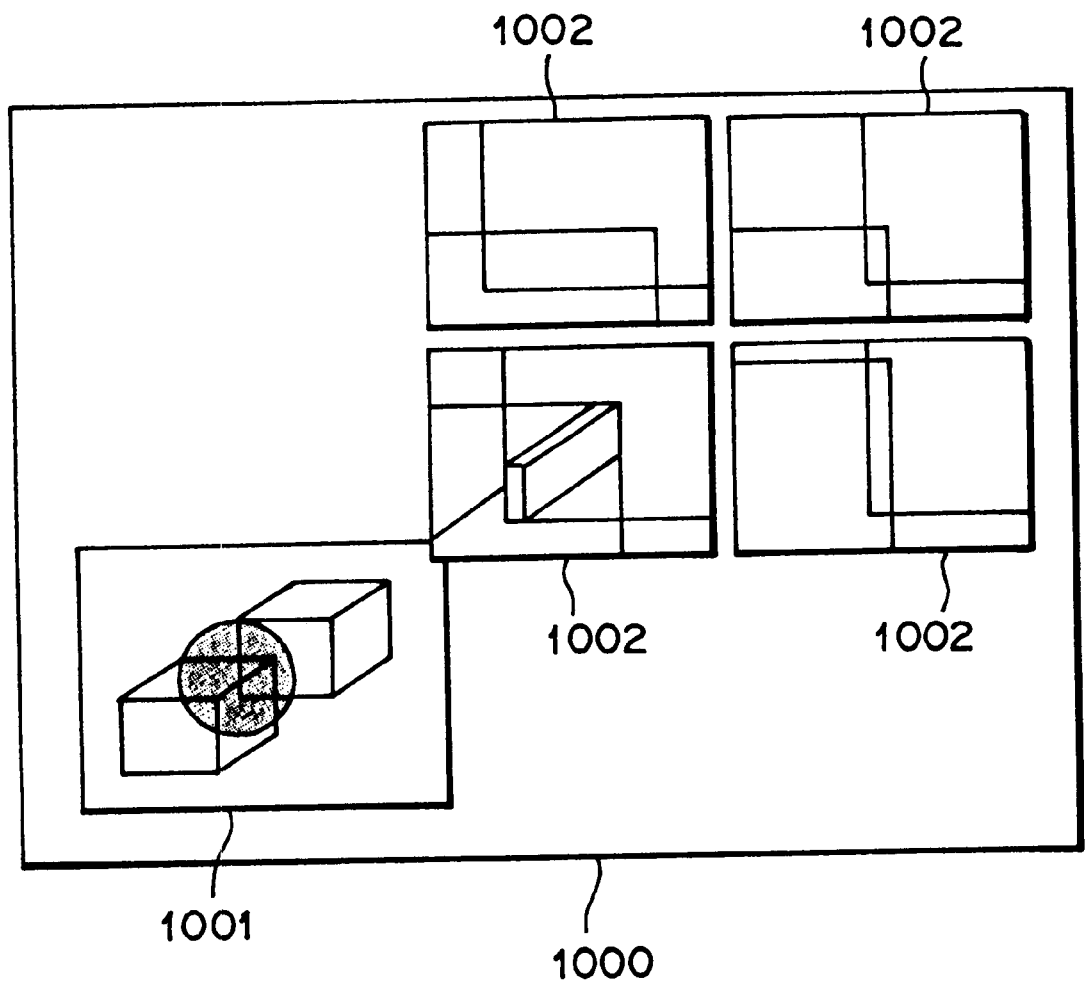
FIG. 22 is a diagrammatic view illustrating a known interference check result displaying method.

FIG. 21 shows a hardware construction and a functional construction of an interference check result displaying apparatus as a modification to the embodiments of the present invention described above. In designing in which a three-dimensional CAD system is used, a modeling or arranging operation of parts which are different among different object equipments or apparatus is performed frequently. Therefore, the interference check result displaying apparatus may be constructed such that, as shown in FIG. 21, object models are produced by a three-dimensional CAD system 16 implemented on another computer (not shown) and data of the object models are fetched in the form of files or the like into a computer 11' through subject data 10 and then interference checking of the object models is performed by the interference checking unit 19.

In such an instance as just described, in the computer 11', a virtual three-dimensional space is developed in a memory (not shown) or the like by the interference checking unit 19, the image data formation unit 18 and so forth, and data of object models fetched through the design subject data 10 are handled in the virtual three-dimensional space.

Further, while the embodiments described above uses the interference checking method disclosed in Japanese Patent Laid-Open No. 27046/1997, Japanese Patent Laid-Open No. 134735/1995, Japanese Patent Laid-Open No. 77210/1996 and so forth, the interference checking method to be used is not limited to the specific one, and any interference checking method can be used in various forms without departing from the spirit and scope of the present invention only if it can perform interference checking processing at a high speed.

The present invention is not limited to the embodiment specifically described above, and variations and modifications can be made without departing from the scope of the present invention.

What is claimed is:

1. An interference check result displaying method for displaying, as a result of interference checking processing performed between objects present in a virtual three-dimensional space, a representative point when contact/interference between the objects occurs on a display unit, comprising the step of:

displaying a rough position and a precise position of a representative point at which contact or interference occurs between the objects in the virtual three-dimensional space simultaneously on said display unit.

2. An interference check result displaying method as claimed in claim 1, wherein a first shape of a small size and a comparatively low transparency centered at the representative point and calculated so as to have a fixed size on said display unit is displayed as the precise position and a second shape of a comparatively high transparency larger than the first shape is displayed as the rough position outside the first shape.

3. An interference check result displaying method as claimed in claim 1, wherein a plurality of pieces which are visually discernible with a fixed size on said display unit are arranged so as to extend radially from the representative point such that the center of the plurality of pieces is indicated as the precise position while radial regions of the plurality of pieces are indicated as the rough position.

4. An interference check result displaying method as claimed in claim 3, wherein at least one of said plurality of pieces is displayed in such a manner as to present a display effect different from that of the other pieces.

5. An interference check result displaying method for displaying a result of interference checking processing performed between objects present in a virtual three-dimensional space on a display unit, comprising the step of:

displaying a variable shape which represents a distance or a relationship between nearest points of the objects as the result of the interference checking processing together with at least one of an index to a position at which contact between the objects occurs, another index to a range in which interference occurs and a further index to a range designated in advance within a range within which contact or interference does not occur.

6. An interference check result displaying method for displaying, as a result of interference checking processing performed between objects present in a virtual three-dimensional space, a representative point when contact/interference between the objects occurs on a display unit, comprising the steps of:

designating, when the result of the interference checking processing performed reveals that a plurality of representative points appear, one of the representative points as a particular point;

displaying the particular point in such a manner as to allow distinction thereof from the other representative points;

calculating a cross section on the display with reference to a viewpoint for viewing the particular point in the virtual three-dimensional space and regions which the objects occupy in the virtual three-dimensional space; and displaying the particular point together with the calculated cross section on the display.

7. An interference check result displaying method as claimed in claim 6, wherein, when the viewpoint is moved on a spherical face centered at the particular point, the cross section on the display is calculated and displayed together with the particular point every time.

8. An interference check result displaying method as claimed in claim 6, wherein, when designation as the particular point is changed to another one of the representative points, the cross section on the display at the representative point after the change is calculated and moved on the display while visual continuity on the display and a particular restriction condition are kept.

9. An interference check result displaying apparatus, comprising:
   an interference checking unit for performing interference checking processing between objects present in a virtual three-dimensional space; and
   a display control unit for controlling a display so that, when a result of the interference checking processing by said interference checking unit reveals that contact or interference occurs between the objects in the virtual three-dimensional space, a rough position and a precise position of a representative point at which the contact or interference occurs are displayed simultaneously.

10. An interference check result displaying apparatus, comprising:
   an interference checking unit for performing interference checking processing between objects present in a virtual three-dimensional space; and
   a display control unit for controlling a display so that a variable shape which represents a distance between nearest points of the objects as a result of the interference checking processing performed by said interference checking unit together with at least one of an index to a position at which contact between the objects occurs, another index to a range in which interference occurs and a further index to a range designated in advance within a range within which contact or interference does not occur is displayed as the result of the interference checking processing.

11. An interference check result displaying apparatus, comprising:
   an interference checking unit for performing interference checking processing between objects present in a virtual three-dimensional space; and
   a display control unit for controlling a display unit so that, when a result of the interference checking processing performed by said interference checking unit reveals that contact or interference occurs between the objects, a representative point at which the contact or interference occurs is displayed on said display unit;
      said display control unit including a discrimination allowing display control unit for controlling said display unit so that, when the interference checking processing reveals that a plurality of representative points appear and one of the representative points is designated as a particular point, the particular point is displayed in such a manner as to allow distinction thereof from the other representative points to allow confirmation of the particular point, and a cross section calculation unit for calculating a cross section on the display with reference to a viewpoint for viewing the designated particular point in the virtual three-dimensional space and regions which the objects occupy in the virtual three-dimensional space;
      said display control unit controlling said display unit so as to display the particular point together with the cross section on the display calculated by said cross section calculation unit.

12. A computer-readable recording medium having an interference check result displaying program recorded thereon for causing a computer to realize:
   an interference checking function for performing interference checking processing between objects present in a virtual three-dimensional space; and
   a display controlling function for controlling so that, when a result of the interference checking processing by the interference checking function reveals that contact or interference occurs between the objects in the virtual three-dimensional space, a rough position and a precise position of a representative point at which the contact or interference occurs between the objects are displayed simultaneously.

13. A computer-readable recording medium having an interference check result displaying program recorded thereon for causing a computer to realize:
   an interference checking function for performing interference checking processing between objects present in a virtual three-dimensional space; and
   a display controlling function for controlling so that a variable shape which represents a distance between nearest points of the objects as a result of the interference checking processing together with at least one of a distance of a range in which contact between the objects occurs, a distance of another range in which interference occurs and a further distance range designated in advance is displayed.

14. A computer-readable recording medium having an interference check result displaying program recorded thereon for causing a computer to realize:
   an interference checking function for performing interference checking processing between objects present in a virtual three-dimensional space; and
   a display controlling function for controlling so that, when a result of the interference checking processing by the interference checking function reveals that contact or interference occurs between the objects, a representative point at which the contact or interference occurs is displayed;
      said display controlling function including a discrimination allowing display controlling function for controlling so that, when the interference checking processing reveals that a plurality of representative points appear and one of the representative points is designated as a particular point, the particular point is displayed in such a manner as to allow distinction thereof from the other representative points to allow confirmation of the particular point, a cross section calculation function for calculating a cross section on the display with reference to a viewpoint for viewing the designated particular point in the virtual three-dimensional space and regions which the objects occupy in the virtual three-dimensional space, and a cross section and particular point displaying function for controlling so that the particular point is displayed together with the cross section on the display calculated by the cross section calculation function.

* * * * *